US009895969B2

(12) United States Patent
Alexander et al.

(10) Patent No.: US 9,895,969 B2
(45) Date of Patent: Feb. 20, 2018

(54) PUSH-PUSH LATCH

(71) Applicant: GM GLOBAL TECHNOLOGY OPERATIONS LLC, Detroit, MI (US)

(72) Inventors: Paul W. Alexander, Ypsilanti, MI (US); Roger Herbert Culver, Rochester Hills, MI (US); Robert Dallos, Jr., Canton, MI (US); Aragorn Zolno, Whittier, CA (US); James Holbrook Brown, Temecula, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 831 days.

(21) Appl. No.: 14/276,390

(22) Filed: May 13, 2014

(65) Prior Publication Data

US 2014/0339834 A1 Nov. 20, 2014

Related U.S. Application Data

(60) Provisional application No. 61/824,008, filed on May 16, 2013.

(51) Int. Cl.
*E05C 3/12* (2006.01)
*B60K 15/05* (2006.01)
(Continued)

(52) U.S. Cl.
CPC .......... *B60K 15/05* (2013.01); *E05B 47/0009* (2013.01); *E05B 83/34* (2013.01); *E05C 19/022* (2013.01); *Y10T 292/0945* (2015.04)

(58) Field of Classification Search
CPC . B60K 15/05; E05C 19/022; Y10T 292/0945; E05B 83/34; E05B 47/0009
See application file for complete search history.

(56) References Cited

U.S. PATENT DOCUMENTS 4,702,506 A * 10/1987 Iimura .................. E05C 19/165
292/251.5
4,709,949 A 12/1987 Umezawa et al.
(Continued)

FOREIGN PATENT DOCUMENTS

CN 1884779 A 12/2006
CN 201068684 Y 6/2008
(Continued)

OTHER PUBLICATIONS

First Search for Chinese Application No. 20141404445.6 dated Apr. 26, 2016; 1 page.

*Primary Examiner* — Matthieu F Setliff
*Assistant Examiner* — Thomas Neubauer
(74) *Attorney, Agent, or Firm* — Harness, Dickey & Pierce, P.L.C.

(57) ABSTRACT

A push-push latch includes a slider slidably disposed on a frame. A resilient element is to urge the slider toward an extended state. The slider or the frame defines a cam-track. A pin member is connected to the frame or the slider. The pin member selectably engages a closed course in the cam-track to cause the slider to alternate between a retracted state and the extended state in response to alternating application and removal of an actuating force on the slider. An interference member is on the frame to selectively prevent the pin member from engaging the closed course thereby locking the slider in the retracted state. A pivotable catch is rotatably on the slider to open in the extended state and to close in the retracted state. A shape memory alloy actuator selectively causes the interference member to selectively prevent the pin member from engaging the closed course.

17 Claims, 13 Drawing Sheets

(51) Int. Cl.
*E05B 47/00* (2006.01)
*E05B 83/34* (2014.01)
*E05C 19/02* (2006.01)

(56) References Cited

U.S. PATENT DOCUMENTS

| | | | |
|---|---|---|---|
| 4,792,165 A * | 12/1988 | Nishimura | E05C 19/022 292/19 |
| 5,217,262 A * | 6/1993 | Kurosaki | E05C 19/022 292/6 |
| 5,292,158 A * | 3/1994 | Kurosaki | E05C 19/022 292/19 |
| 5,836,638 A | 11/1998 | Slocum | |
| 5,915,766 A * | 6/1999 | Baumeister | B04B 7/06 292/201 |
| 5,984,381 A * | 11/1999 | Yamagishi | E05C 19/022 267/158 |
| 6,149,450 A | 11/2000 | Gastineau | |
| 6,986,535 B2 * | 1/2006 | Kawamoto | E05C 19/022 200/524 |
| 7,165,790 B2 * | 1/2007 | Bella | E05C 19/022 292/302 |
| 8,398,127 B2 | 3/2013 | Persiani et al. | |
| 8,457,784 B2 * | 6/2013 | Rahilly | G07G 1/0027 221/151 |
| 9,243,427 B2 | 1/2016 | Weber et al. | |
| 2007/0281532 A1 | 12/2007 | Cannon | |
| 2012/0308294 A1 * | 12/2012 | Corcoran | G11B 33/125 403/33 |
| 2013/0102163 A1 | 4/2013 | Basavarajappa et al. | |
| 2015/0330118 A1 * | 11/2015 | Alexander | E05B 85/10 292/200 |

FOREIGN PATENT DOCUMENTS

| | | |
|---|---|---|
| CN | 201896508 U | 7/2011 |
| CN | 102155126 A | 8/2011 |
| CN | 202295731 U | 7/2012 |
| CN | 102917904 A | 2/2013 |
| CN | 104481313 A | 4/2015 |
| DE | 102014106846 A1 | 11/2014 |
| WO | WO-2010095831 A2 | 8/2010 |

* cited by examiner

PUSH-PUSH LATCH

CROSS REFERENCE TO RELATED APPLICATION

This application claims the benefit of U.S. Provisional Patent Application Ser. No. 61/824,008, filed May 16, 2013, which is incorporated by reference herein in its entirety.

BACKGROUND

Latches, such as, e.g., push-push latches may be used to selectively join two or more objects. Latches may also be used to selectively restrict relative motion between two objects. For example, a latch may hold a door in a closed position until the latch is actuated to allow the door to open. Latches may be used with hinged doors, sliding drawers and other closures. Latches may also be used to selectively join objects that are not closures, for example adjustable legs on a tripod or straps on a seat belt. A push-push latch is operated by pushing on a first object in a direction of a second object to release the push-push latch. The first object and the second object may be rejoined by pushing the first object toward the second object to engage the push-push latch. A common example of a push-push mechanism may be found in the refraction mechanism for a click retractable ball-point ink pen.

SUMMARY

A push-push latch includes a slider slidably disposed on a frame. A resilient element is to urge the slider toward an extended state. The slider or the frame defines a cam-track. A pin member is connected to the frame or the slider. The pin member selectably engages a closed course in the cam-track to cause the slider to alternate between a retracted state and the extended state in response to alternating application and removal of an actuating force on the slider. An interference member is disposed on the frame to selectively prevent the pin member from engaging a portion of the closed course, thereby locking the slider in the retracted state. A pivotable catch is rotatably disposed on the slider to open in the extended state and to close in the retracted state. A shape memory alloy actuator selectively causes the interference member to selectively prevent the pin member from engaging the closed course.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
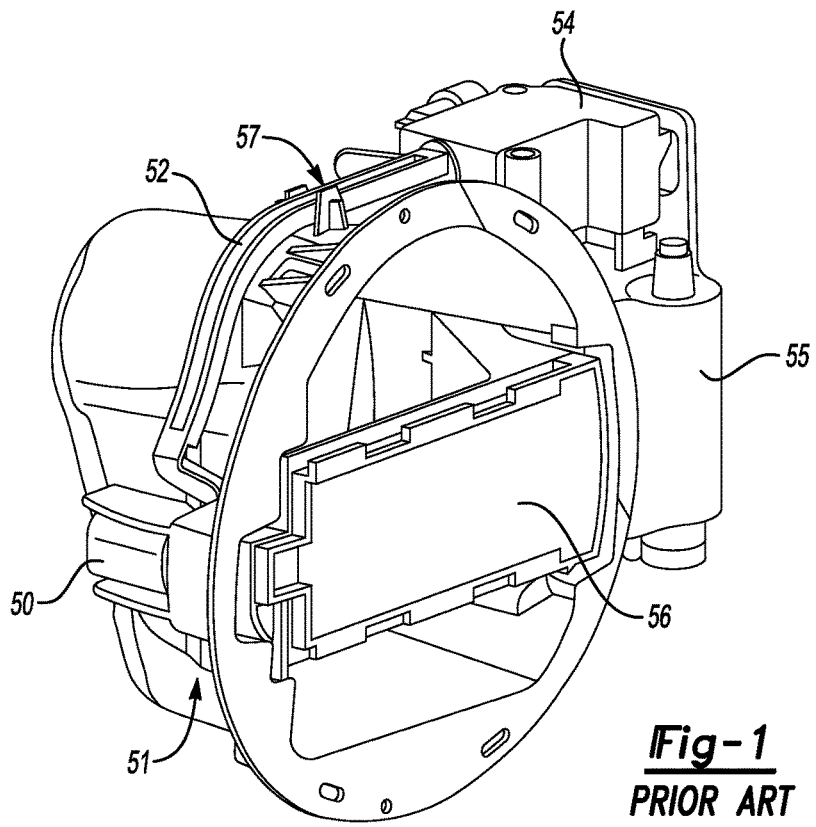
FIG. 1 is a perspective view of a prior art assembly of a fuel filler housing with a motorized locking mechanism and a lock bolt that engages a hinge plate.

Push-push latches may be found in a variety of applications. Examples of the present disclosure selectably restrict the ability to actuate a push-push latch. In an example of the present disclosure, a vehicle fuel filler door with a push-push latch may be locked in a closed position. In the example, a Shape Memory Alloy (SMA) actuator may be used to selectably lock-out or enable the operation of the push-push latch. Although some examples presented herein may include or be attached to a fuel filler door on a vehicle, it is to be understood that examples of the present disclosure may be used in any application where a push-push latch is used for retention of any object that can move between a plurality of states.

Further, in examples of the present disclosure, SMA actuation can replace a manually triggered operation of a push-push latch to yield an electrically controlled automatic latch. In examples of the present disclosure having electrically controlled automatic latches, access control over an electrical triggering system may provide access control to actuation of the push-push latch. For example, a button to open a fuel filler door in a vehicle may be located in a lockable passenger compartment of the vehicle. As such, the ability to open the fuel filler door may be limited to people with access to the lockable passenger compartment. In examples of the present disclosure, SMA actuation may allow for a more compact, lower mass, and lower cost alternative to conventionally actuated latches.

Shape Memory Alloys

As stated above, an SMA actuator may be used to lock-out or enable the operation of the push-push latch according to the present disclosure. SMAs may have two phases: a lower modulus, lower temperature, crystalline martensite phase; and a higher modulus, higher temperature, austenite phase of a different crystal structure. The transition from one phase to the other may, by appropriate choice of alloy system, alloy composition, heat treatment or applied stress, be selected to occur over a temperature span of from $-100°$ C. up to about $+150°$ C. Some SMAs exist in their martensite form at, or slightly above, about $25°$ C., and transform to their austenite form at temperatures ranging from about $60°$ C. to about $80°$ C. With such characteristics, an SMA implemented in a motor vehicle will be in its martensitic phase at essentially any expected ambient temperature, and the SMA will transform to austenite with only modest heating.

SMAs may be used as mechanical actuators. Some alloys for actuator applications are prepared as linear members. These members may be wires, but other suitable shapes include tapes, chains or cables. For brevity only, and without limitation, the term wire may be used in this disclosure where other suitable shapes may be used. SMA wires, after shaping to a desired 'remembered' length or shape in their austenite phase, are cooled to ambient temperature. On cooling, the SMA wires will revert to their martensite crystal structure. The wires may then be stretched and deformed to some predetermined length. The deformation exceeds the maximum allowable elastic strain which may be imposed on the actuator and is often termed pseudo-plastic deformation. These pseudo-plastically-deformed martensitic wires are in the appropriate starting condition for an actuator.

Generally the stretch or strain, that is, the change in length of the wire divided by its original or base length, applied during such pseudo-plastic deformation does not exceed 7% and more commonly may be 4% or less. The base length, to which all length changes are referred, is the length of the wire in its high temperature, austenite phase.

Deformed martensitic shape memory alloys may, when heated and transformed to austenite, revert to their original undeformed shape and are capable of exerting appreciable force as they do so. In changing shape, the SMA wire will shorten by an amount substantially equal to the pseudo-plastic strain previously applied when the SMA wire was in its martensitic form. As such, by suitable choice of wire length, any desired displacement may be achieved. For example, a 100 mm length of wire, prestrained to 3% strain, may enable a displacement of about 3 mm.

SMAs are able to apply a significant force as the SMA changes length, thereby making SMAs suitable for use as actuators in mechanical devices. For example, a pseudo-plastically stretched martensite SMA wire of a length suitable for an intended displacement may be heated along its entire length and transformed to austenite. The transformation to austenite causes the SMA wire to contract so that it may linearly displace an attached moving element.

The attached moving element may be a locking element in a push-push latch which may be deployed on-demand by action of the SMA actuator according to the present disclosure. Also, by addition of pulleys, levers, gears, and similar mechanical contrivances, an SMA actuator may be adapted to enable rotary motion. Any heat source may be used to elevate the SMA wire temperature and promote its transition to austenite. As disclosed herein, if the SMA wire is heated uniformly along its length and throughout its cross-section so that substantially the entire volume of the SMA wire may be heated and transformed, the transformation will occur simultaneously throughout the SMA wire volume.

In examples of the present disclosure, electrical resistance heating produces uniform heating of an SMA wire. Electrical connections may be made to the SMA wire ends for attachment to a suitable power source (e.g., a vehicle power bus), and a controlled current may be passed along the length of the SMA wire.

Actuator action may be reversed by stopping the passage of the electric heating current and allowing the SMA wire to cool to about ambient temperature and revert to its martensitic crystal structure. Forced cooling may not be necessary. During cooling, the SMA wire may, in some examples, not spontaneously change its length to its initial deformed length but, in its martensitic phase, the SMA wire may be readily stretched again to its initial predetermined length. Any suitable approach, including deadweights, may be employed to stretch the wire. In an example, a spring positioned in series or parallel with the SMA wire may be used.

Figure 2:
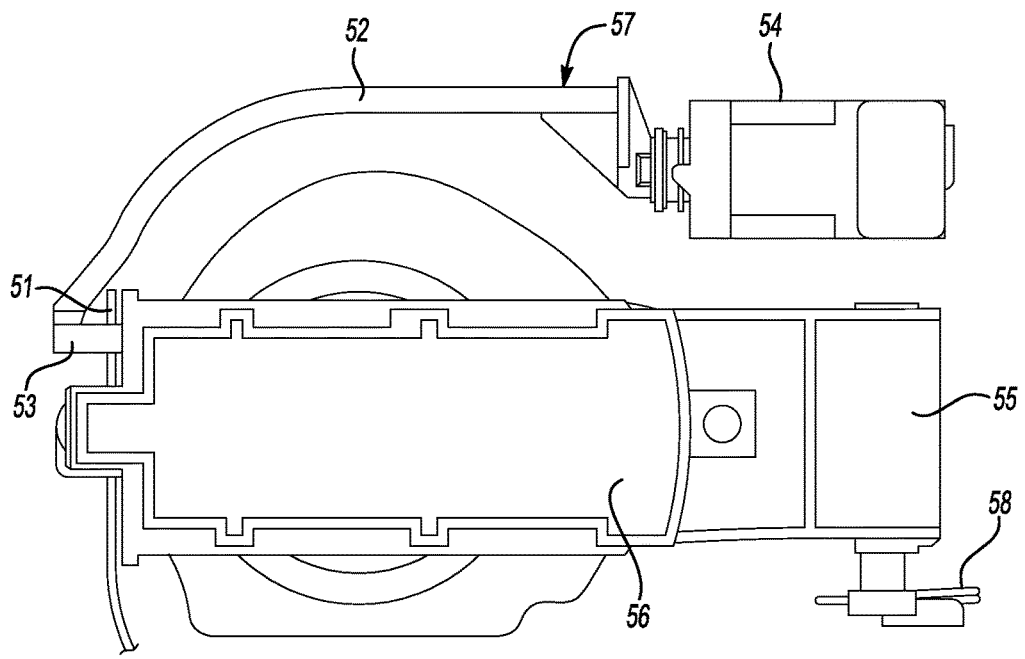
FIG. 2 is a front view of the prior art assembly depicted in FIG. 1.
Figure 3:
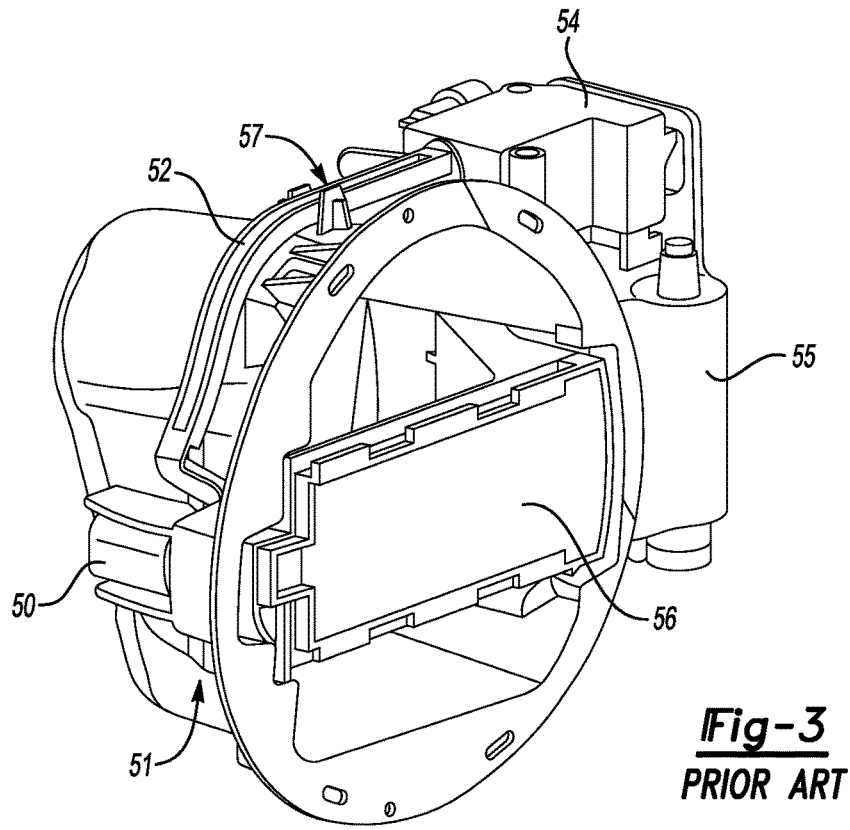
FIG. 3 is a perspective view of the prior art assembly depicted in FIG. 1.

Referring now to FIGS. 1, 2 and 3, an existing locking fuel filler door mechanism is depicted. Examples of the present disclosure eliminate the large motor 54 depicted near the door hinge 55 shown in FIGS. 1, 2 and 3. It is believed that examples of the present disclosure may be produced at a lower financial cost than the system depicted in FIGS. 1, 2 and 3, but with similar ease of use. As depicted in FIGS. 1, 2 and 3, the large motor 54 locks and unlocks a fuel filler door (not shown) attached to the hinge plate 56. When the fuel filler door is unlocked, a push-push mechanism 50 may be used to reversibly present the fuel filler door for further opening. In FIGS. 1, 2 and 3, the mechanism for the motor driven lock 57 is separate from the push-push mechanism 50. When the user pushes the fuel filler door in (toward the fuel filler housing), the push-push mechanism 50 responds by moving an edge of the fuel filler door outward, beyond the body surrounding the door (not shown in FIG. 1, 2 or 3). The fuel filler door opens partially, for example about 10 degrees, and a torsion spring 58, with or without additional user input, opens the fuel filler door fully, for example, the fuel filler door is rotated on the door hinge 55 about 90 degrees from the closed position. The locking feature depicted in FIGS. 1, 2 and 3 is operated independently of the push-push mechanism 50. The locking bolt 53 engages the hinge plate 56 of the fuel filler door through the fuel filler housing 51 to substantially prevent the fuel filler door from moving relative to the fuel filler housing 51. The locking bolt 53 prevents the fuel filler door from pressing on the push-push mechanism 50. When the locking bolt 53 is withdrawn from the hinge plate 56, the fuel filler door is free to be actuated by pushing the fuel filler door in toward the fuel filler housing 51, thereby actuating the push-push mechanism 50.

Figure 4:
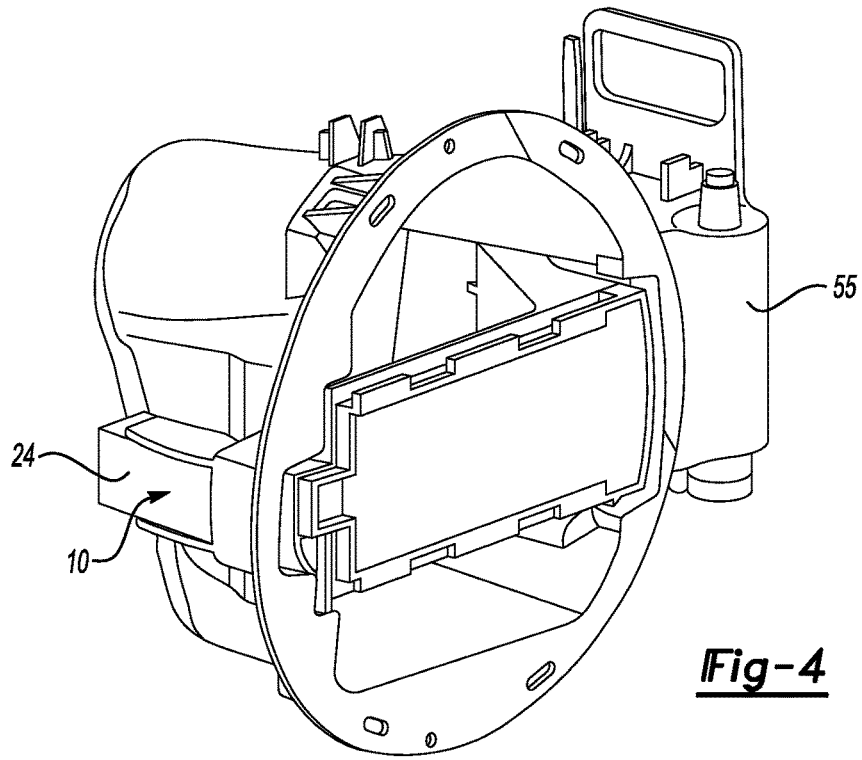
FIG. 4 is a perspective view of an example of an assembly of a fuel filler housing including a locking push-push latch according to the present disclosure.

In examples of the present disclosure, combining a lock function with the push-push mechanism allows the deletion of the large motor 54 and linkage 52 (shown in FIGS. 1-3) from the fuel filler door assembly. As illustrated by comparing FIGS. 3 and 4, examples of the lockable push-push latch 10 of the present disclosure (e.g., FIG. 4) package in a similar volume to the existing push-push mechanism 50 (e.g., FIG. 3).

In examples of the present disclosure, motion of the push-push latch 10 may be disabled or enabled via a lock-out feature that is articulated using an SMA actuator 20. Examples of the push-push latch 10 of the present disclosure may have a pin member, slider, ring, cam or other similar component whose position controls the range of motion of other components in the push-push latch 10. By controlling the position of the pin member, the relative motion of the movable components of the push-push latch 10 may be selectively restricted or prevented. Examples of the present disclosure may selectively prevent or allow opening of a door to control access to a space that is covered by the door. In another example, selectively preventing or allowing opening of the door may be to prevent inadvertent opening of the door under certain conditions. For example, it may be desirable to substantially prevent a fuel filler door of a vehicle from opening when the vehicle is being washed by an automatic car wash system.

In another example of the present disclosure, an SMA force generator 21 may selectively drive motion of the push-push latch 10. As used herein, the term SMA force generator 21 means an SMA actuator and is used to differentiate between the SMA actuator 20 that selectably locks and unlocks the push-push latch 10, and the SMA force generator 21 that causes an actuating force on the slider of the push-push latch 10. An external electronic controller (not shown) may control not only the level of motion/access that is allowed by the push-push latch 10, but also release or engage the retention feature that such an example of a push-push latch 10 provides. In examples of the present disclosure, the push-push latch 10 may present or stow other components that are in communication with the push-push latch 10. For example, an operator may close a switch in a passenger compartment of a vehicle. When the switch is closed, the SMA force generator 21 and the SMA actuator 20 may cooperate with the push-push latch 10 to cause a slider to move to an extended position. As a result, the fuel filler door opens without direct mechanical action by the operator on the fuel filler door. In other words, the fuel filler door opens without first having to be pushed to close the switch. This push-push actuation system, in the absence of a torsion spring 58 that opens the fuel filler door, may also be triggered a second time to initiate a re-latching operation on the basis of a switch or other signaling means so that operator input is not required to secure the door.

In examples of the present disclosure applied to a vehicle fuel filler door 12, the push-push latch 10 may be within the vehicle body (not shown), at an outer edge of the fuel filler housing 51. The fuel filler door 12 includes a mating feature 14 to the push-push latch 10. (See FIGS. 5-8.) It is to be understood that the location of the push-push latch 10 may be reversed (i.e., push-push latch 10 on the fuel filler door 12, mating feature on the fuel filler housing 51). Further, the push-push latch 10 may be located anywhere within the closure system that provides the same performance, including, for example, within and/or around the door hinge 55.

Figure 10:
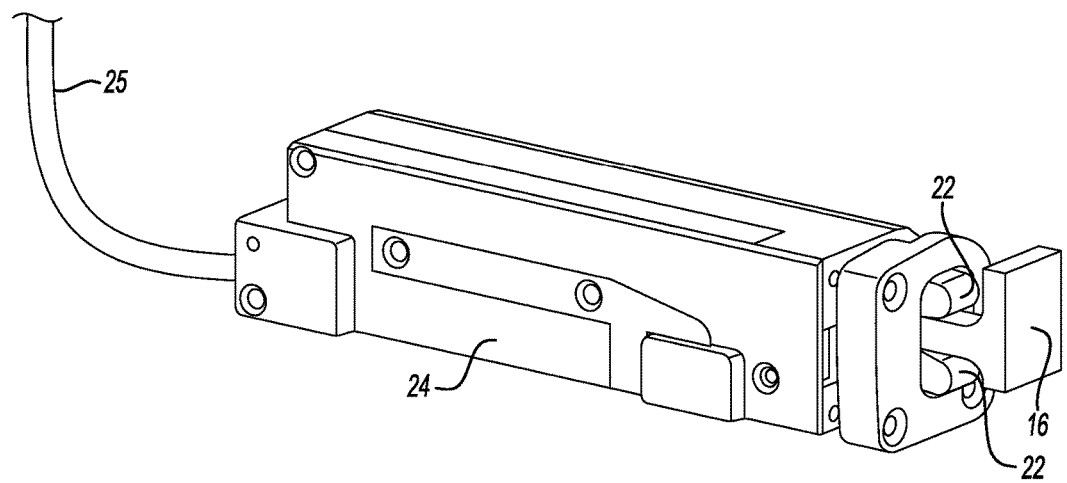
FIG. 10 is a perspective view of the example of the locking push-push latch depicted in FIG. 5.
Figure 11A:
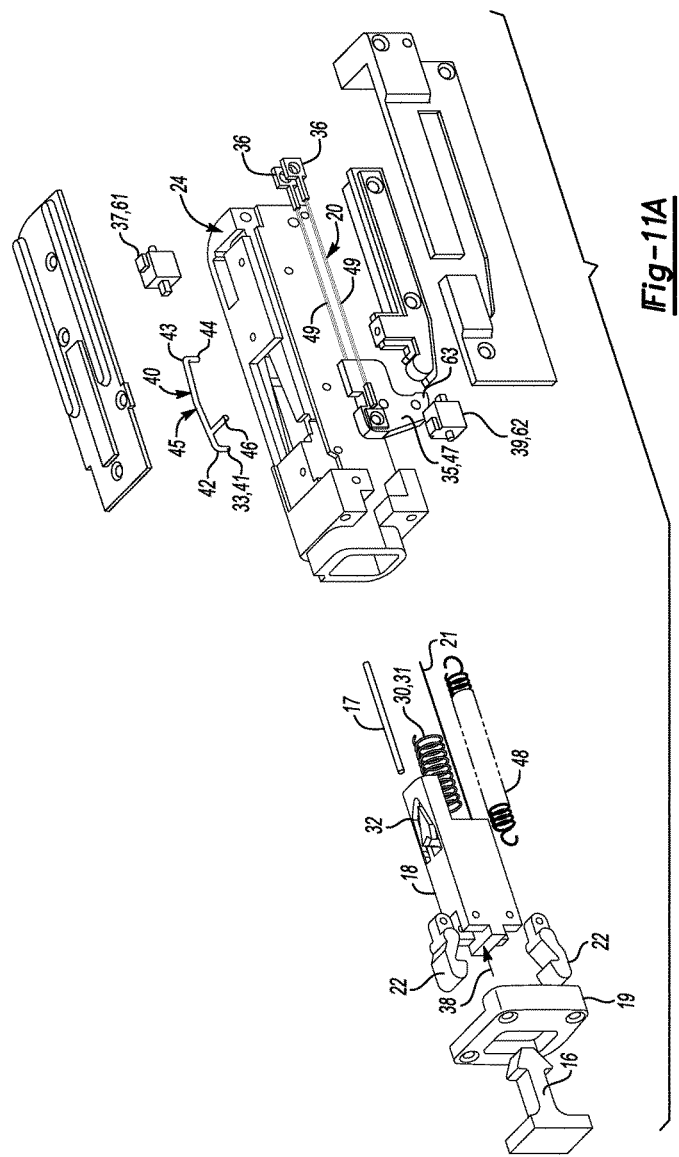
FIG. 11A is an exploded perspective view of the example of the locking push-push latch depicted in FIG. 10, rotated 180 degrees.
Figure 11B:
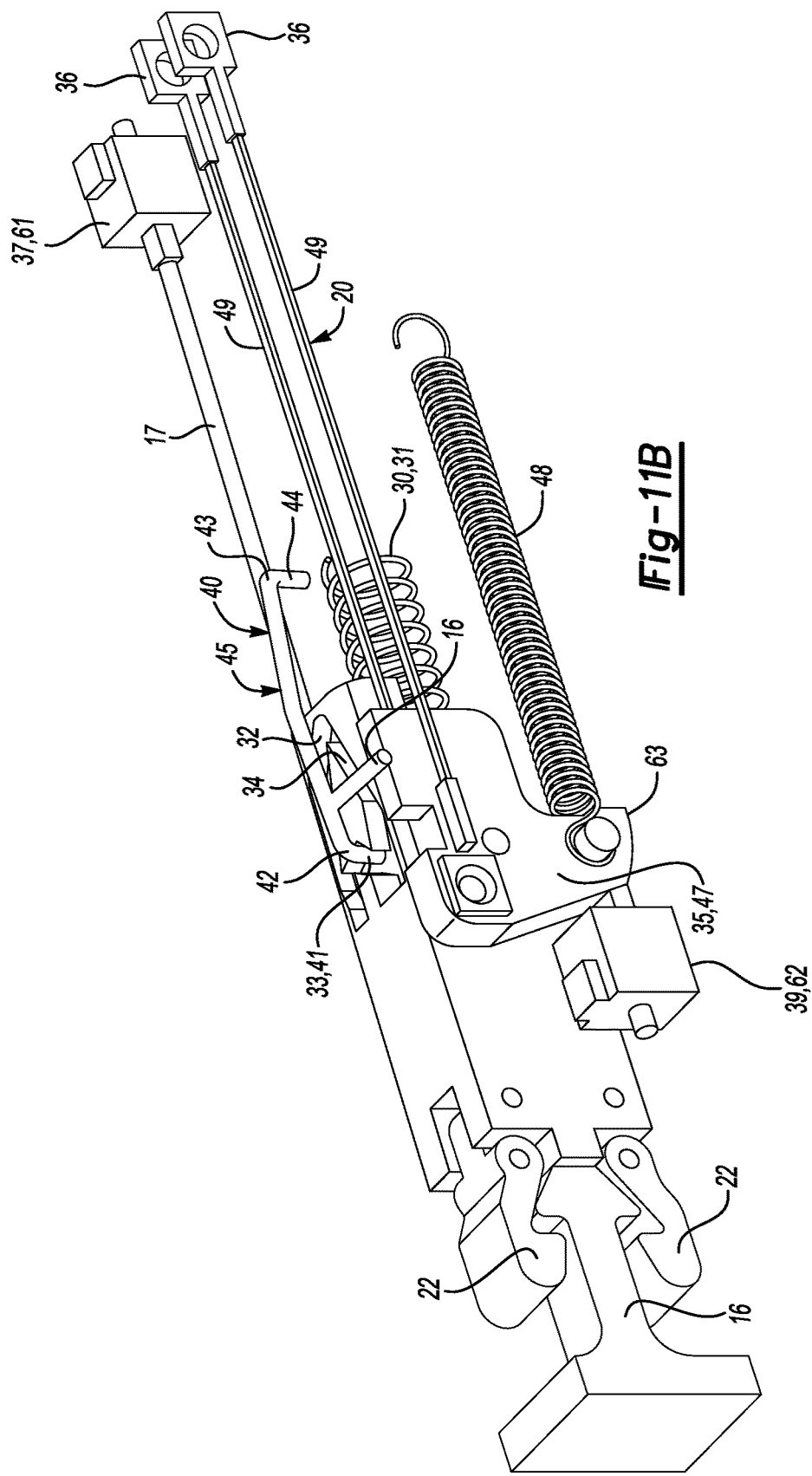
FIG. 11B is perspective assembled view of some components from FIG. 11A.

In examples of the present disclosure shown generally in FIGS. 4-19B, a push-push latch 10 includes a frame 24 and a slider 18 slidably disposed on the frame 24. The slider 18 may slide linearly, rotationally, or both linearly and rotationally with respect to the frame 24. A resilient element 30 is to urge the slider 18 toward an extended state. The resilient element 30 may be a helical compression spring 31 as shown in FIGS. 11A and 11B. In examples, the resilient element 30 may be made of spring steel, plastic, or resilient rubber compounds. The resilient element 30 may have any form suitable for urging the slider 18 toward the extended state, for example, a helical compression spring 31, helical extension spring, solid rubber bumper, foam bumper, etc.

A cam-track 32 is defined by the slider 18. The pin member 33 is connected to the frame 24. The push-push latch 10 may be kinematically inverted: having the cam-track 32 defined by the frame 24, and the pin member 33 connected to the slider 18. The pin member 33 is to selectably engage a closed course 34 in the cam-track 32 to cause the slider 18 to alternate between a refracted state and the extended state in response to alternating application and removal of an actuating force 38 on the slider 18. An interference member 35 is disposed on the frame 24 to selectively prevent the pin member 33 from engaging a portion of the closed course 34, thereby locking the slider 18 in the retracted state. A pivotable catch 22 is rotatably disposed on the slider 18 to open in the extended state and to close in the retracted state. The pivotable catch 22 may be rotatably disposed on the slider 18 to open and close in response to relative movement of the slider 18 with respect to the frame 24. The pivotable catch 22 may be to selectively capture a flange-headed post 16 fixedly attached to an object (e.g., a fuel filler door). An SMA actuator 20 is to selectively cause the interference member 35 to selectively prevent the pin member 33 from engaging the closed course 34. Examples of the present disclosure use energy efficiently, at least in part because the interference member 35 requires very little mechanical work to actuate.

Examples of the push-push latch 10 as presently disclosed may include an electrical connector 36 in electrical contact with the SMA actuator 20 to connect the SMA actuator 20 to an actuating source of electrical energy. The actuating source of electrical energy may be, for example, electrical current to pass through the SMA actuator 20 and heat the SMA actuator 20 to at least the transition temperature of the SMA actuator 20, thereby actuating the SMA actuator 20.

The push-push latch 10 may include a sensor 37 to detect movement of the slider 18 in response to the actuating force 38. The SMA actuator 20 is connected to the actuating source of electrical energy in response to a detection (e.g., by the sensor 37) of the movement of the slider 18 in response to the actuating force 38. It should be noted that in this description, the actuating force 38 is not produced by the SMA actuator 20. To clarify by example, the actuating force 38 may be produced by pressing on the fuel filler door 12.

The actuating force 38 may be produced, for example, manually or by an SMA force generator 21 (see FIG. 11A) as discussed above.

The push-push latch 10 may include a sensing element 39 to detect a completion of actuation of the SMA actuator 20 when the SMA actuator 20 is connected to the actuating source of electrical energy. An electrical power supplied to the SMA actuator 20 may be reduced in response to the sensing element 39 detecting the completion of actuation of the SMA actuator 20.

Figure 5:
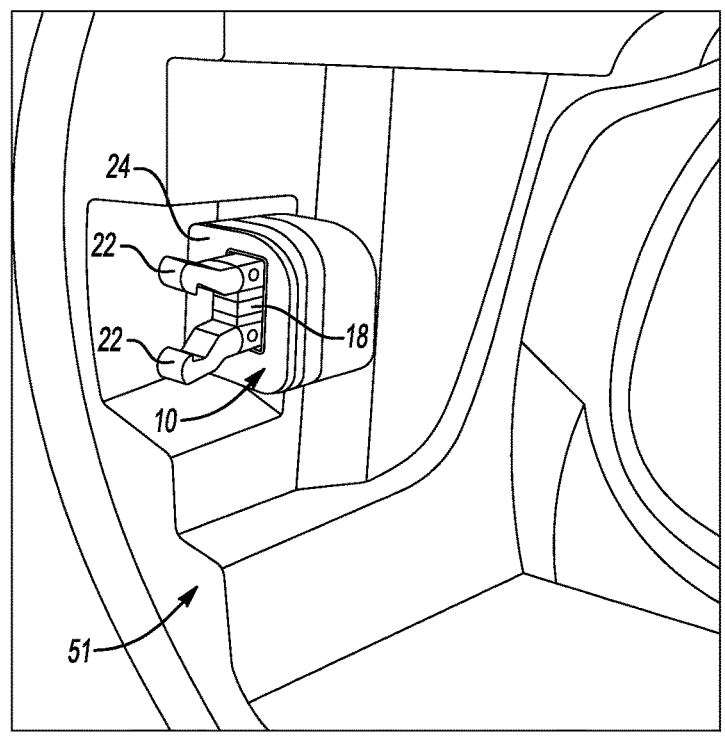
FIG. 5 is a right perspective view depicting an example of a locking push-push latch installed in a fuel filler housing according to the present disclosure.

FIG. 5 depicts an example of a locking push-push latch 10 with the frame 24 installed in a fuel filler housing 51 according to the present disclosure. In the example depicted in FIG. 5, the slider 18 is shown in an extended state, and a pair of opposed pivotable catches 22 are shown open. Although an opposed pair of pivotable catches 22 is shown in FIG. 5, it is to be understood that any number of pivotable catches may be included in example(s) of the present disclosure. For example, a single pivotable catch 22 may be included. In another example, six or more pivotable catches 22 may be included.

Figure 6:
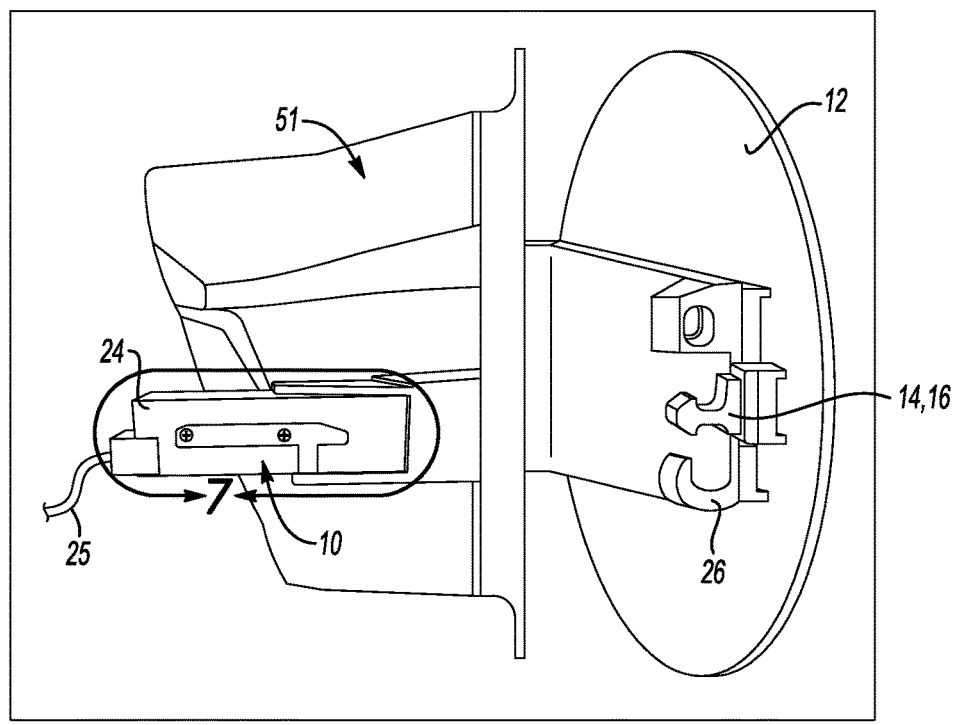
FIG. 6 is a side view of the example of the locking push-push latch installed in the fuel filler housing depicted in FIG. 5.

FIG. 6 is a side view of the example of the locking push-push latch 10 installed in the fuel filler housing 51 depicted in FIG. 5. In FIG. 6, the frame 24 of the push-push latch 10 extends horizontally from an attachment location on the fuel filler housing 51. The term "horizontally" refers to the orientation on the page, and does not convey a limitation on orientations of the push-push latch 10 with respect to gravity. The push-push latch 10 may be installed at any orientation with respect to gravity. In the example depicted in FIG. 6, the flange-headed post 16 is the mating feature 14 to the push-push latch 10 attached to the fuel filler door 12. The flange-headed post 16 is distinguished from the cap stowage hook 26, shown on the fuel filler door 12 below the flange-headed post 16. During refueling of a vehicle, a tether 28 connected to a fuel cap 29 may be draped over the cap stowage hook 26 to prevent the fuel cap 29 (see FIG. 22) from contacting a painted surface of the vehicle.

Figure 7:
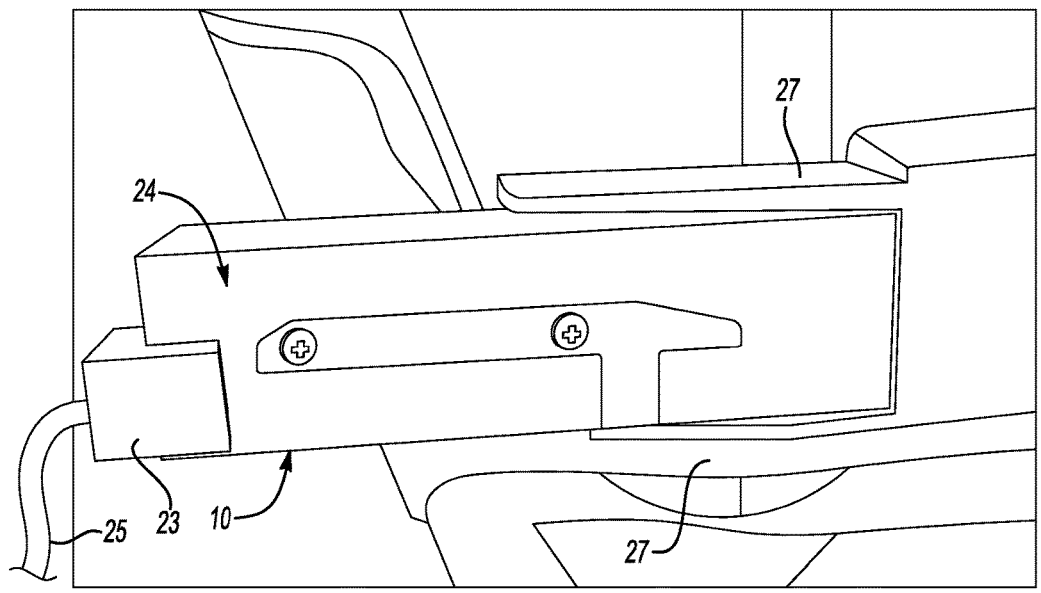
FIG. 7 is a detail view of the portion of the view indicated at the window depicted in FIG. 6.
Figure 8:
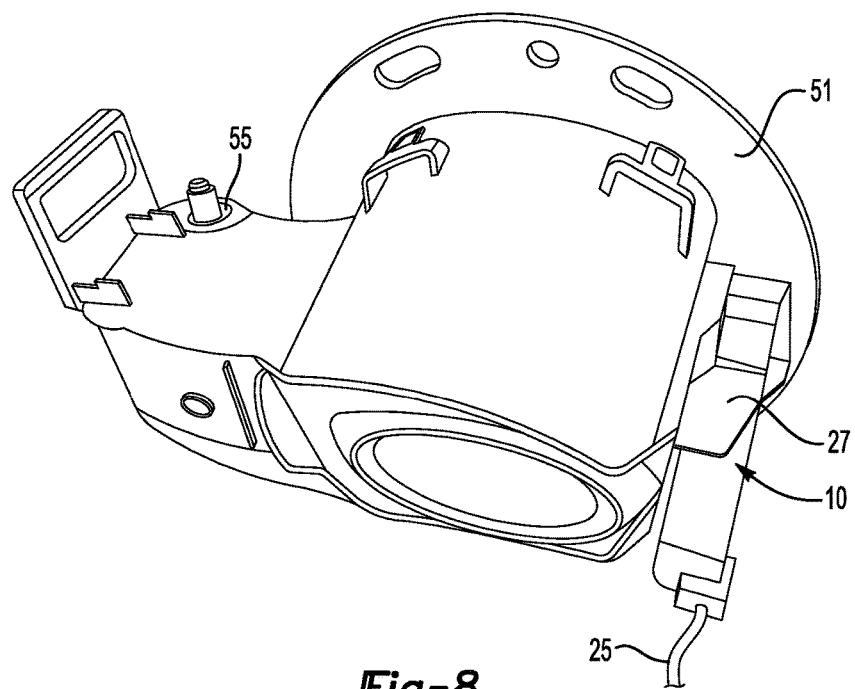
FIG. 8 is a top rear perspective view of the assembly of the locking push-push latch installed in the fuel filler housing depicted in FIG. 5.

FIG. 7 is a detail view of the portion of the view indicated at the window depicted in FIG. 6. In the example depicted in FIG. 7, ribs 27 are molded into the fuel filler housing 51. The push-push latch 10 is disposed between the ribs 27. An electrical cable 25 is shown extending from an end 23 of the push-push latch 10. The electrical cable 25 may have any number of mutually insulated electrical conductors disposed therein. For example, two conductors may connect the SMA actuator 20 to a source of electrical energy. Conductors may also be included to transmit signals from sensors in the push-push latch 10. FIG. 8 is a top rear perspective view of the assembly of the locking push-push latch 10 installed in the fuel filler housing 51 depicted in FIG. 5.

Figure 9:
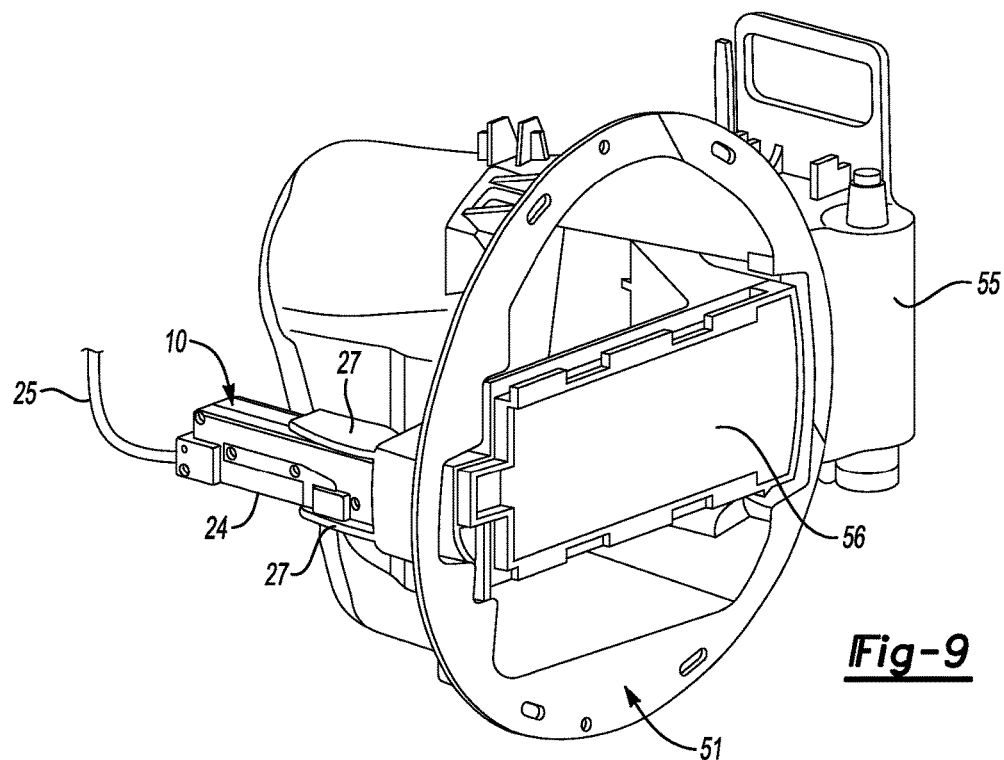
FIG. 9 is a perspective view of the example of the locking push-push latch installed in the fuel filler housing depicted in FIG. 5.

FIG. 9 is a perspective view of the example of the locking push-push latch 10 with the frame 24 installed in the fuel filler housing 51 depicted in FIG. 5. FIG. 10 is a perspective view of the example of the locking push-push latch 10 depicted in FIG. 5. Unlike FIG. 5, the locking push-push latch 10 depicted in FIG. 10 has the slider 18 (not visible in this view) in the retracted state, and the pair of opposed pivotable catches 22 are shown closed to capture the flange-headed post 16.

FIG. 11A is an exploded perspective view of the example of the locking push-push latch 10 depicted in FIG. 10, rotated 180 degrees. A cam spring 40 is shown having a first leg 41 on a cam follower end 42 of the cam spring 40. An anchor end 43 is distal to the cam follower end 42. A second leg 44 is on the anchor end 43 of the cam spring 40. A resilient bridge 45 connects the first leg 41 and the second leg 44. The first leg 41 is the pin member 33. The second leg 44 is attached to the frame 24. An index lever 46 projects from the resilient bridge 45. An actuator lever 47 is pivotably attached to the frame 24. The actuator lever 47 is in operable contact with the index lever 46. The actuator lever 47 is an example of the interference member 35 described above.

FIG. 11A shows a helical extension spring 48 connected to the actuator lever 47 and to the frame 24 to urge the actuator lever 47 antagonistically to the resilient bridge 45 via the index lever 46 to extract the pin member 33 at least partially from the closed course 34 in the cam-track 32, thereby locking the slider 18 in the retracted state. If the slider 18 is in the extended state when the pin member 33 is at least partially extracted from the closed course 34, the slider 18 will be movable to the retracted state, where the pin member 33 will become trapped. In the example applied to the fuel filler door, if the fuel filler door is open, the fuel filler door will lock when pushed to the closed position. The SMA actuator 20 is connected to the actuator lever 47 to contract in an actuated state to overcome the helical extension spring 48 and allow the resilient bridge 45 to cause the pin member 33 to engage the closed course 34. The helical extension spring 48 is to cause the SMA actuator 20 to stretch in an unactuated state.

The example of the locking push-push latch 10 depicted in FIG. 11A further includes two electrical connectors 36 in electrical contact with the SMA actuator 20 to connect the SMA actuator 20 to an actuating source of electrical energy. As depicted in FIG. 11A, the SMA actuator 20 includes two SMA wires 49. The two SMA wires 49 are attached to the actuator lever 47 mechanically in parallel. In other examples, a number of SMA wires 49 in the SMA actuator 20 may be in a range from one to any positive integer. The SMA wires 49 may be individual strands, or may be bundled in a cable (not shown).

FIG. 11A depicts a first electrical switch 61 to close an electrical circuit to connect the SMA actuator 20 to the actuating source of electrical energy in response to a detection of a movement of the slider 18 in response to the actuating force 38. The first electrical switch 61 is the sensor 37 to detect movement of the slider 18 in response to the actuating force 38 described above. In FIG. 11A, a push rod 17 mechanically connects the slider 18 to the first electrical switch 61. When the actuating force 38 is applied, the slider moves to the right in the page orientation depicted in FIG. 11A, thereby pressing on the push rod 17 and actuating the first electrical switch 61.

FIG. 11A shows a second electrical switch 62 to detect a completion of actuation of the SMA actuator 20. The second electrical switch 62 is the sensing element 39 to detect a completion of actuation of the SMA actuator 20 when the SMA actuator 20 is connected to the actuating source of electrical energy. An electrical power supplied to the SMA actuator 20 is reduced in response to the second electrical switch 62 detecting the completion of actuation of the SMA actuator 20. In an example, the electrical power supplied to the SMA actuator 20 may be partially reduced; in another example, the electrical power supplied to the SMA actuator 20 may be completely reduced (to zero Watts). In the example depicted in FIG. 11A, the second electrical switch 62 detects the completion of actuation of the SMA actuator 20 by detecting a position of the actuator lever 47. When the SMA actuator 20 contracts, the actuator lever 47 rotates clockwise in the orientation shown in FIG. 11A. The rotation of the actuator lever 47 moves a crank arm 63 of the actuator lever 47 to actuate the second electrical switch 62.

Still referring to FIG. 11A, an opposed pair of the pivotable catches 22 is shown. Each of the pivotable catches 22 is rotatably disposed on the slider 18 to open and close in response to relative movement of the slider 18 with respect to the frame 24. The pivotable catches 22 are to selectively capture a flange-headed post 16 that is fixedly attached to an object, for example, a fuel filler door 12 (e.g., see FIG. 6). As depicted in FIG. 11A, the pivotable catches 22 cooperate with the collar 19 (the collar 19 is a removable part of the frame 24) to cause the pivotable catches 22 to rotate toward each other when the slider 18 retracts into the frame 24.

FIG. 11B is a perspective assembled view of some components from FIG. 11A. The pin member 33 is depicted in the closed course 34 of the cam-track 32. Interaction between the pin member 33 and guide ridges (not shown) in the bottom of the cam-track 32 guide the pin member 33 through the closed course 34. In other words, the pin member 33 gets stuck in a portion of the cam-track 32 when the pin member 33 is raised above the guide ridges. When the SMA actuator 20 contracts in an actuated state, the actuator lever 47 overcomes the helical extension spring 48 and rotates to allow the resilient bridge 45 to lower the index lever 46 to lower the pin member 33 into the guide ridges (not shown) to engage the entire closed course 34 of the cam-track 32.

The SMA wires 49 of the SMA actuator 20 operate mechanically in parallel, however they are electrically connected in series. As such, the electrical power and return are attached to a static location, eliminating the need for a moving lead wire. This paragraph discloses parameters of an example of the push-push latch 10 of the present disclosure. The SMA wire 49 length is about 76 mm and the diameter is about 2.032 mm. In an example, the operating voltage may range from about 9V-16V (Volts). It is to be understood that the voltage range may be increased or decreased from this range. For example, the voltage range may be compatible with nominally 24V and 48V vehicle systems. Approximate contraction time is about 0.05 seconds. Approximate actuator wire stroke is 2.28 mm. A switch may cut power at the end of the actuator wire's stroke. Approximately 2 A (Amperes) may be applied to the SMA wire 49 initially, followed by a drop to about 0.25 A when the SMA wire 49 reaches the end of the stroke. Stress on the SMA wire 49 is approximately 15 ksi (thousand pounds per square inch). Reset time is about 2.3 seconds at room temperature.

Another example of a locking push-push latch 10' is depicted in various operative states in FIGS. 12A-12D and FIGS. 13-19B. The slider 18' is slidable along a longitudinal axis 64 of the frame 24'. A shuttle slot 68 is defined in the frame 24' perpendicular to the longitudinal axis 64. A shuttle 70 is slidably disposed in the shuttle slot 68. The shuttle 70 has a pin member 33' extending from the shuttle 70 into the cam-track 32'. Pin member 33' extends into the cam-track 32', and would not be visible to an observer having a point of view depicted in FIGS. 12A-19B. Conventionally, pin member 33' would be depicted in hidden line. However, since hidden line would cause some of the contour of the pin member 33' shown in FIGS. 12A-19B to be hidden, the pin member 33' is shown in solid line. A hinge knuckle 65 is disposed on the frame 24' at a hinge end 66 of the frame 24'. A blocking pawl 67 is pivotably disposed about a hinge pin 69. In the example depicted in FIGS. 12A-12D and FIGS. 13-19B, the blocking pawl 67 is the interference member 35. The blocking pawl 67 has a pawl end 71 and a heel end 72 on opposite sides of the hinge pin 69. The hinge pin 69 is disposed through complementary sized holes in the blocking pawl 67 and the hinge knuckle 65. A locking spring 73 is to urge the blocking pawl 67 to a locked position in contact with the shuttle 70 to selectively prevent the pin member 33' from engaging the portion of the closed course 34 thereby locking the slider 18' in the retracted state. An SMA wire 49 is attached to the frame 24' at a catch end 74 distal to the hinge end 66 of the frame 24'. The SMA wire 49 is looped around the heel end 72 of the blocking pawl 67. The blocking pawl 67 may have a groove 76 defined therein to help retain the SMA wire 49. The SMA wire 49 is to produce a torque on the blocking pawl 67 when the SMA wire 49 is actuated. The torque produced by the SMA wire 49 on the blocking pawl 67 is antagonistic to the locking spring 73 (best seen in FIG. 17).

Upon actuation of the SMA wire 49, the SMA wire 49 is to overcome the locking spring 73 and lift the pawl end 71 to allow the shuttle 70 to slide in the shuttle slot 68 without interference from the blocking pawl 67. This allows the pin member 33 to engage the closed course 34 in the cam-track 32' to cause the slider 18' to alternate between the retracted state and the extended state in response to alternating application and removal of the actuating force on the slider 18'. Upon termination of the actuation of the SMA wire 49, the SMA wire 49 is to relax and stretch to cause the blocking pawl 67 to return to the locked position.

The push-push latch 10' may include an electrical connector 36' in electrical contact with the SMA wire 49 to connect the SMA wire 49 to an actuating source of electrical energy (not shown). A first electrical switch 61' is to close an electrical circuit to connect the SMA wire 49 to the actuating source of electrical energy in response to a detection of a movement of the slider 18' in response to the actuating force 38'. A second electrical switch 62' may be included to detect a completion of actuation of the SMA wire 49. An electrical power supplied to the SMA wire 49 may be reduced in response to the second electrical switch 62' detecting the completion of actuation of the SMA wire 49. When the SMA wire 49 contracts, the blocking pawl 67 rotates counter clockwise in the orientation shown in FIG. 14. The rotation of the blocking pawl 67 may be used to actuate the second electrical switch 62' (best seen in FIG. 17).

In an example of the present disclosure, the SMA wire 49 momentarily allows a fuel filler door 12 to open. When the car is unlocked, power is left on for a circuit that provides power to the push-push latch 10' on a fuel filler door circuit. No electrical power is used until the fuel filler door 12 is moved toward the interior of the vehicle body. When the fuel filler door 12 is moved toward the interior of the vehicle body, the first electrical switch 61' is closed allowing the electrical power to flow to the actuator which allows the fuel filler door 12 to open. Additional switches or similar current control devices may be employed to modulate power to the SMA wire 49 when it is in the actuated state for a prolonged period of time. When the car is locked, the fuel filler door circuit may be depowered, and the fuel filler door may remain locked. The example may include a single SMA wire 49, though multiple wires or other SMA actuator architectures could be used, such as a helical coil, tube, ribbon, plate, etc.

Additionally, two SMA actuators could be used in tandem, one to drive the blocking pawl 67 to a first position (e.g., locked state) and another to drive the blocking pawl 67 to a second position (e.g., unlocked state). This actuation architecture could further include an over-center spring, which can hold the blocking pawl 67 in either of the two states, giving it bistable performance.

In other words, the push-push latch having bistable performance has a second SMA actuator to selectively cause the interference member 35 to selectively allow the pin member 33 to engage the closed course 34. An over-center spring, which may be the locking spring 73, is operatively connected to the interference member 35. In response to the interference member 35 entering a first position corresponding to preventing the pin member 33 from engaging the closed course 34, the over-center spring is to hold the interference member 35, without power being applied to the SMA actuator 20, in the first position until the second SMA actuator 20 causes the interference member 35 to enter a second position corresponding to allowing the pin member 33 to engage the closed course 34. Further, in response to the interference member 35 entering the second position corresponding to allowing the pin member 33 to engage the closed course 34, the over-center spring is to hold the interference member 35, without power being applied to the second SMA actuator in the second position, until the SMA actuator 20 causes the interference member to enter the first position corresponding to preventing the pin member 33 from engaging the closed course.

Still referring to FIGS. 12A-19B, an opposed pair of the pivotable catches 22' is shown. Each of the pivotable catches 22' is rotatably disposed on the slider 18' to open and close in response to relative movement of the slider 18' with respect to the frame 24'. The frame 24' may be attached to a fuel filler housing 51 similarly to the attachment of the frame 24 in the filler housing 51 depicted in FIG. 9. The pivotable catches 22' are to selectively capture a flange-headed post 16 that is fixedly attached to an object, for example, a fuel filler door 12 (e.g., see FIG. 12A). The pivotable catches 22' cooperate with the frame 24' to cause the pivotable catches 22 to rotate toward each other when the slider 18' retracts into the frame 24'.

Figure 19A:
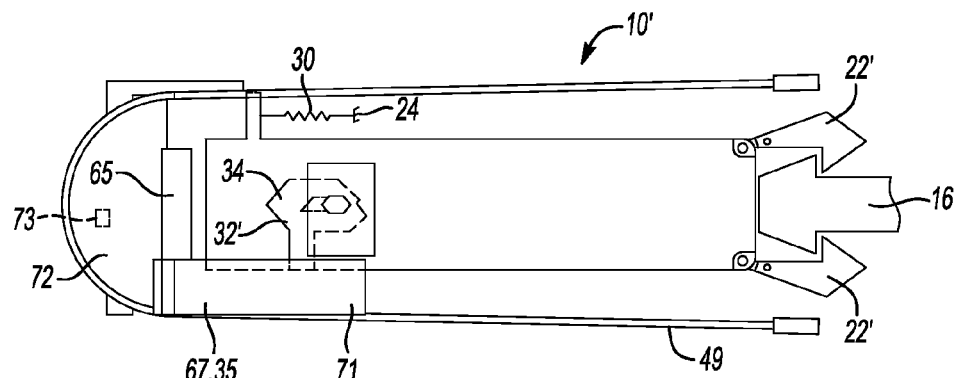
FIG. 19A is a semi-schematic side view of the example of the locking push-push latch shown in FIG. 16, in the locked and latched state with the latch captured.
Figure 19B:
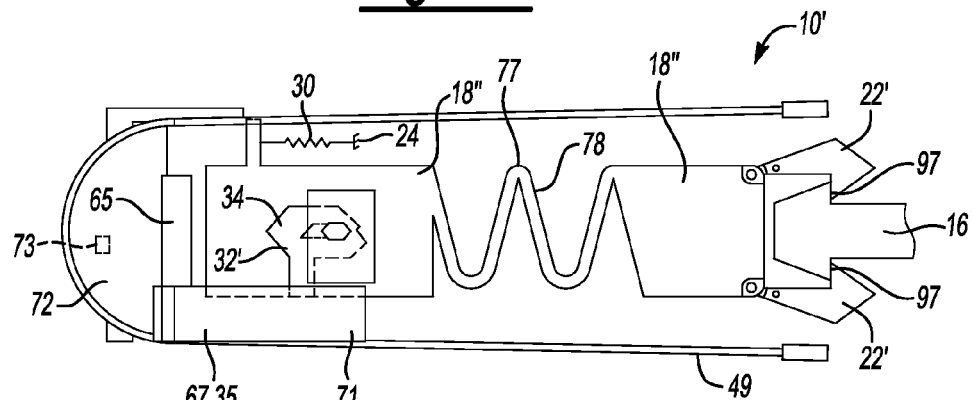
FIG. 19B is a semi-schematic side view of an example of the locking push-push latch, depicted in the locked and latched state with the latch applying a pull force.

In the example of the push-push latch 10' depicted in FIG. 19B, an elastic element 77 may be disposed mechanically in series with the slider 18'' to absorb an overload force 38' greater than the actuating force 38 applied to the slider 18''. Such a compliant slider 18'' makes the push-push latch 10' more robust. In some examples of the push-push latch 10', if the flange-headed post 16 is pushed or pulled while the push-push latch 10' is in a locked state (e.g., the blocking pawl 67 is in the locked position), there will be an applied stress to some of the fine features of the pin member 33' and cam-track 32' as well as other components of the push-push latch 10'. By incorporating an elastic element in series with the slider 18'', the slider 18'' becomes a strain relief to protect some of the finer features as described above. In an example, a spring pattern 78 may be the elastic element 77 incorporated into the slider 18''.

Figure 12A:
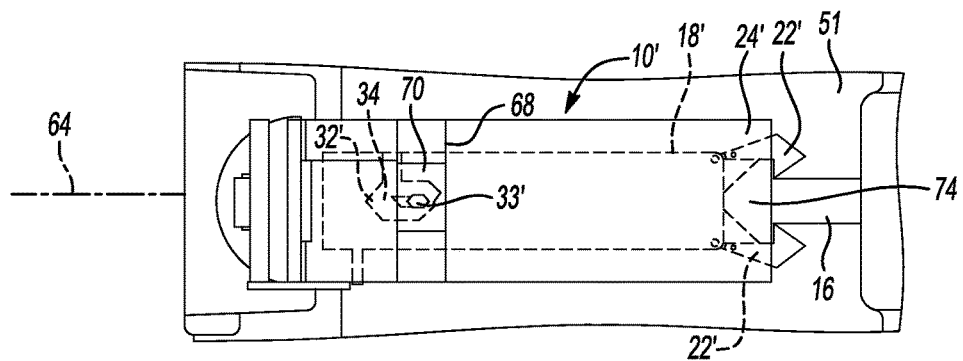
FIGS. 12A-12D are a series of semi-schematic side views of an example of a locking push-push latch according to the present disclosure.
Figure 12B:
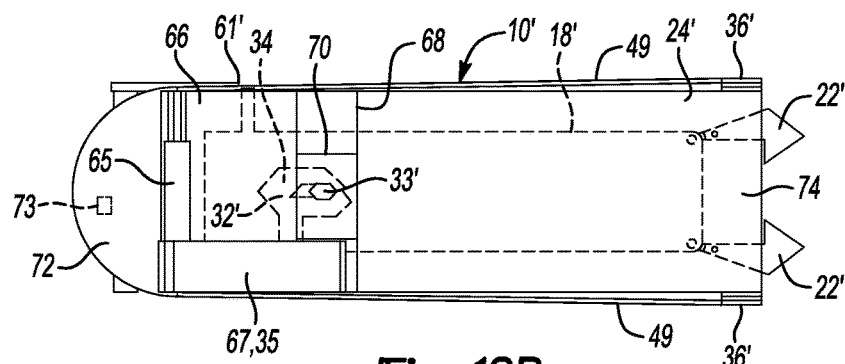
Figure 12C:
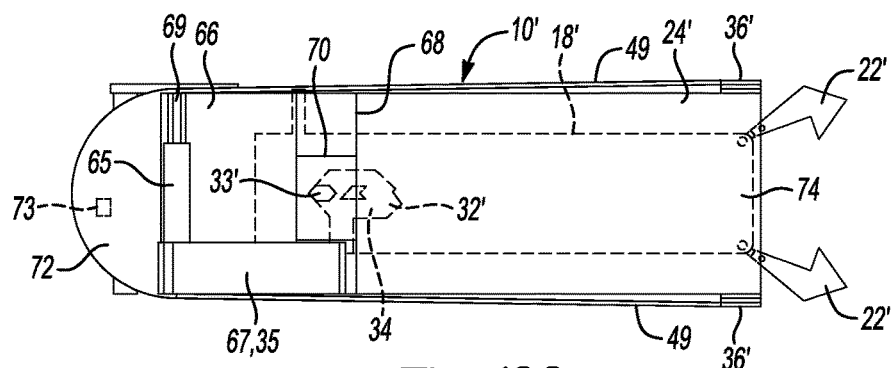
Figure 12D:
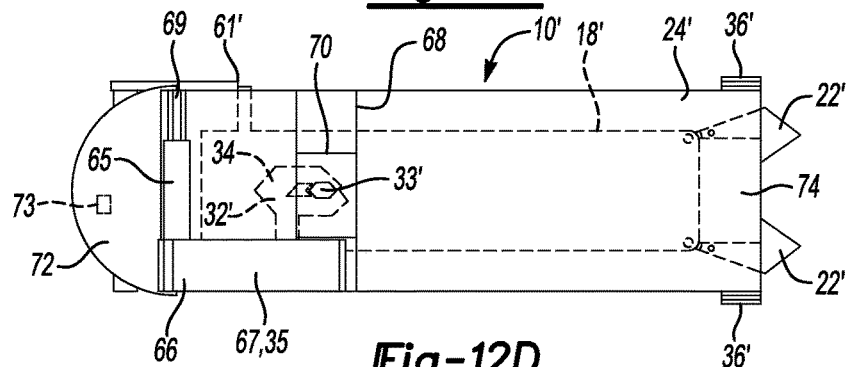
Figure 13:
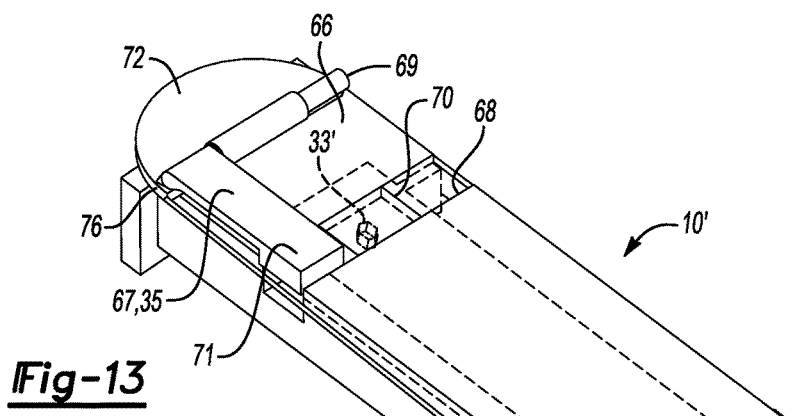
FIG. 13 is a semi-schematic lower perspective view of the example of the locking push-push latch shown in FIGS. 12A-12D, depicted in a locked state.
Figure 14:
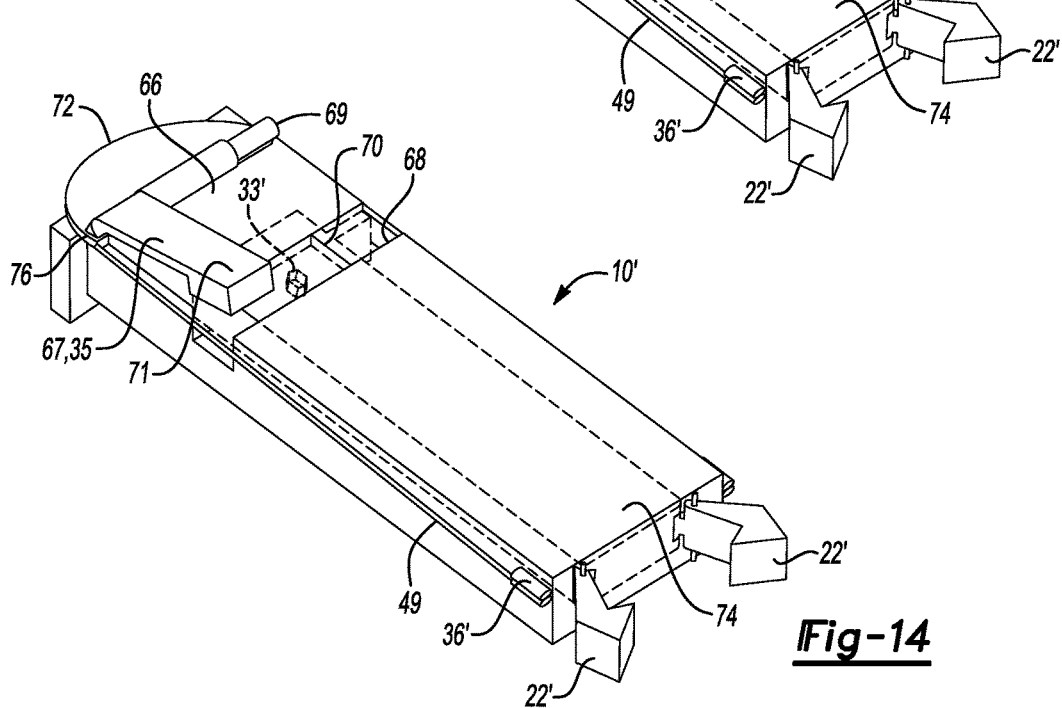
FIG. 14 is a semi-schematic lower perspective view of the example of the locking push-push latch shown in FIG. 13, depicted in an unlocked state.

FIG. 12A depicts the fuel filler door 12 held closed in a latched state. The flange-headed post 16 is shown engaging opposed pivotable catches 22. FIG. 12B shows the push-push latch 10' in the same operative state as depicted in FIG. 12A, except the fuel filler door 12 and flange-headed post 16 is not shown. FIG. 12B depicts a rectangular shaped shuttle 70 with a pin member 33' projecting from a center of the shuttle 70. The pin member 33' slides in the cam-track 32' defined in the slider 18'. In the page orientation depicted in FIG. 12B, the shuttle 70 moves up and down, and the slider 18' moves left and right. The blocking pawl 67 selectably blocks the shuttle 70 and prevents the shuttle 70 from moving up and down. When the shuttle 70 cannot move up and down, the cam-track and pin member 33' interfere and substantially prevent the slider 18' from moving. FIG. 13 shows the blocking pawl 67 in a blocking or locked state. FIG. 14 shows the blocking pawl 67 in an unlocked state. FIG. 12C depicts the push-push latch 10' with the slider 18' in the extended state. When the slider 18' is in the extended state, the pivotable catches 22 are open like open jaws. Contacts for the first electrical switch 61' are depicted in FIG. 12D. When a force of sufficient magnitude is applied to the slider 18', the resilient element 30 is overcome, and the contacts close an electrical power circuit in electrical communication with the SMA actuator 20. In other words, pushing on the door closes the first electrical switch 61' to provide electrical power to the SMA actuator 20. In the example depicted in FIGS. 13 and 14, the SMA wire 49 contracts in response to power being applied by closing the switch. When the SMA wire 49 contracts, the blocking pawl 67 pivots about the hinge pin 69, and the push-push latch 10' will allow the fuel filler door 12 to open substantially instantaneously. For example, the push-push latch 10' may allow the fuel filler door to open in less than 1 second. In another example, the push-push latch 10' may allow the fuel filler door to open in less than 0.1 second. The SMA actuator 20 does not interfere with latching the door closed; therefore there is no delay in closing the push-push latch 10'. The actual time to "lock" the push-push latch by the SMA actuator 20 moving to the relaxed position may be less than about 2 seconds. Operation of the SMA actuator is substantially silent.

Figure 15:
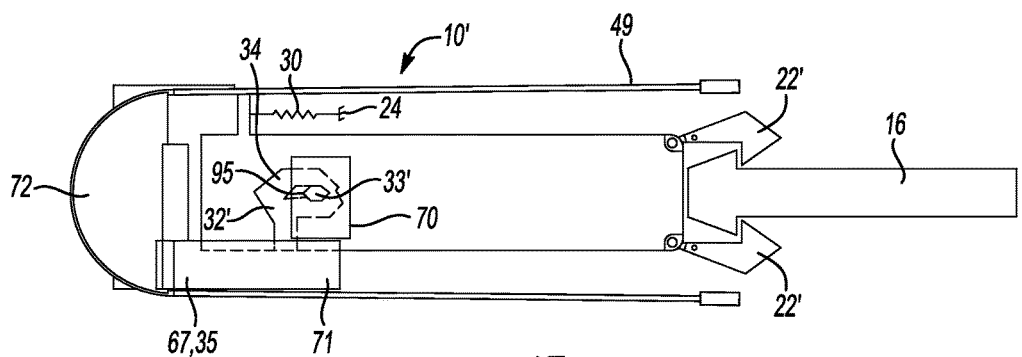
FIG. 15 is a semi-schematic side view of the example of the locking push-push latch shown in FIG. 14, depicted in a latched state.

FIG. 15 is a semi-schematic side view of the example of the locking push-push latch shown in FIG. 14, depicted in a latched state. The pivotable catches 22 are closed and latch the flange-headed post 16. The resilient element 30 urges the cam-track 32' into engagement with the pin member 33' at notch 95. The resilient element 30 is depicted schematically as an extension spring that is attached to the frame 24 and urges the slider 18' to the right in the page orientation. The push-push latch 10' may be locked or unlocked when in the latched state.

Figure 16:
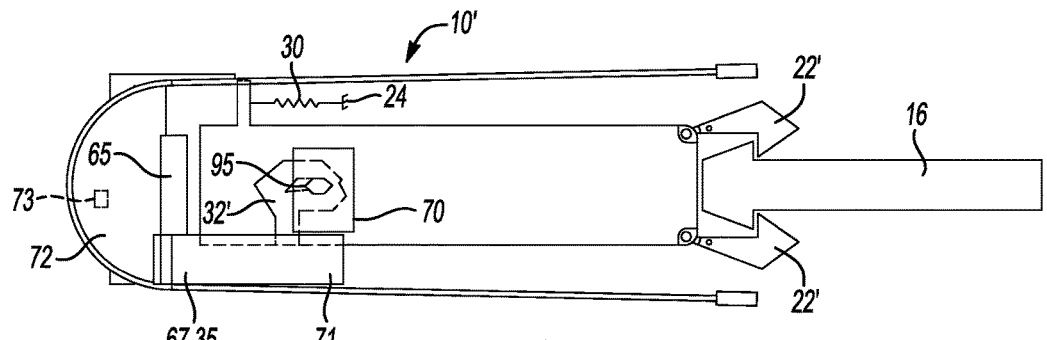
FIG. 16 is a semi-schematic side view of the example of the locking push-push latch shown in FIG. 14, depicted in a locked and latched state.
Figure 17:
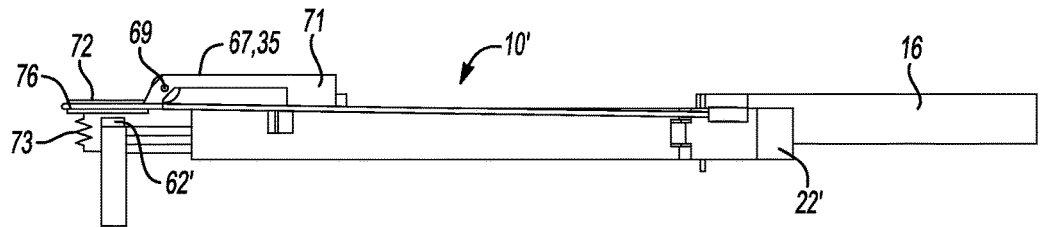
FIG. 17 is a semi-schematic bottom view of the example of the locking push-push latch shown in FIG. 16, depicted in the locked and latched state.

FIG. 16 is a semi-schematic side view of the example of the locking push-push latch 10' shown in FIG. 14, depicted in a locked and latched state. The pivotable catches 22' are closed and latch the flange-headed post 16. The resilient element 30 urges the cam-track 32' into engagement with the pin member 33' at notch 95. FIG. 16 is to be considered together with FIG. 17 to convey that the blocking pawl 67 is blocking the movement of the shuttle 70, thereby rendering the push-push latch 10' in the locked state.

Figure 18A:
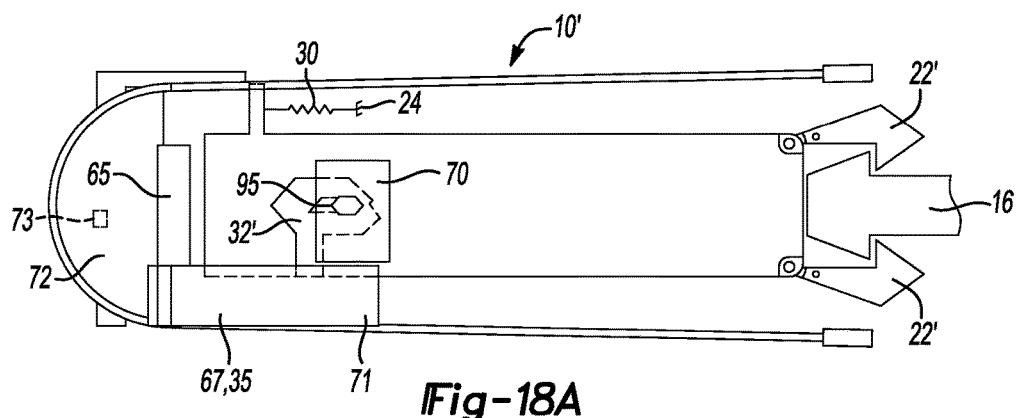
FIG. 18A is a semi-schematic side view of the example of the locking push-push latch shown in FIG. 16, in the locked and latched state with the latch captured.

FIG. 18A is a semi-schematic side view of the example of the locking push-push latch 10' shown in FIG. 16 in the locked and latched state with the flange-headed post 16 captured, but not placing a load on the push-push latch 10'. Note that there is no contact between the flange-headed post 16 and any part of the push-push latch 10'. The resilient element 30 urges the cam-track 32' into engagement with the pin member 33' at notch 95.

Figure 18B:
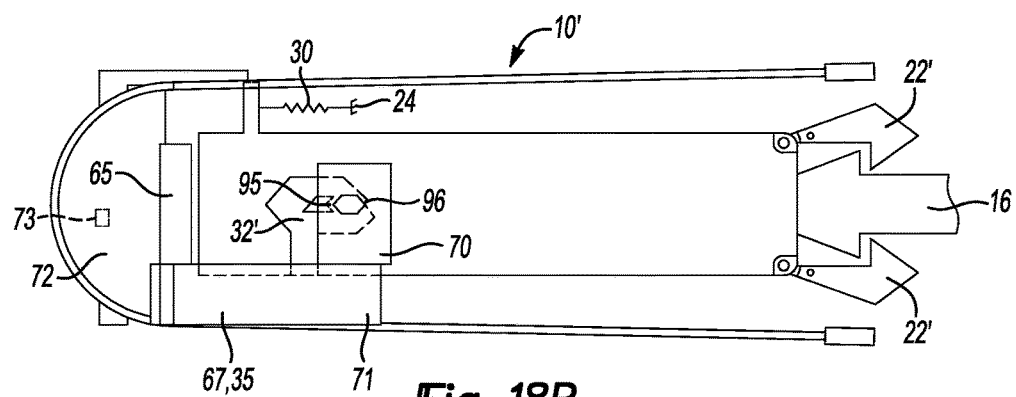
FIG. 18B is a semi-schematic side view of the example of the locking push-push latch shown in FIG. 18A, in the locked and latched state with the latch applying a push force.

FIG. 18B is a semi-schematic side view of the example of the locking push-push latch shown in FIG. 18A in the locked and latched state with the flange-headed post 16 applying a push force. The slider 18' has moved slightly to the left, and the cam-track 32' contacts the pin member 33' at ridge 96. The angle of the contact between the cam-track 32' and the pin member 33' in FIG. 18B urges the shuttle 70 down as the actuating force from the flange-headed post 16 urges the slider 18' to the left. However, because the blocking pawl 67 is blocking the shuttle 70 from moving down, the pin member 33' and the cam-track 32' will re-engage at notch 95 when the actuating force 38 of the flange-headed post 16 is removed.

FIG. 19A is a semi-schematic side view of the example of the locking push-push latch shown in FIG. 16, in the locked and latched state with the flange-headed post 16 captured, but not placing a load on the push-push latch 10'. FIG. 19A is for comparison with FIG. 19B. In FIG. 19B, the flange-headed post 16 is depicted applying a pull force. Note the contact between the flange-headed post 16 and the pivotable catches 22' at points 97. The elastic element 77 allows the slider 18" to stretch to prevent the pin member 33' or the cam-track 32' from being mechanically overloaded.

Further examples may incorporate a seal into the frame. Switches may be incorporated onto a Printed Circuit Board (PCB). An electrical connector may be integrated into the frame. Various parts in the examples described herein may be combined. Tang features may be added to the slider. Examples of the push-push latch may click when unlatching to provide aural and tactile feedback.

Actuation of the SMA articulated features of the present disclosure may be initiated via a number of systems and methods. Some examples of actuation may include: 1) a dedicated button, switch or other user interface within a vehicle that initiates the feature by direct input from the operator; 2) articulation triggered by a command signal from a control unit which triggers the latch in response to other internal or external conditions (e.g., in response to gear selection, such as in the "park" condition); 3) articulation triggered by a command signal from a control unit which enables the latch and other features in conjunction with one-another feature (e.g., unlocking doors and the fuel filler door at the same time); 4) triggering via a remote device (e.g., in response to input to a keyfob or smart phone); and 5) internal triggering based on an overall vehicle state (e.g., un-locked) in conjunction with user input (e.g., operator pushing on the fuel filler door).

In examples of the present disclosure, control electronics for the push-push latch 10 may be small enough to be integrated directly into the device package with minimal impact. This integration may allow examples of the push-push latch 10 having a PCB to be fully functional with as few as two input leads. Additional PCB features may include input flexibility, for example by populating or not populating portions of the PCB, which would allow a wide range of electrical inputs to operate the push-push latch 10.

In an example of the present disclosure, the push-push latch 10' may receive two inputs to actuate the SMA actuator 20. A first input may be an electrical signal to an integrated PCB (not shown) mounted on the frame 24. The electrical signal may be in either a locked or unlocked logic state. In an example, the first input may be based on a sensed condition. For example, the first input may be based on a speed of a vehicle. In an oven door application, the first input may be based on a temperature of the oven. The second input may be mechanical. When the user pushes on an object attached to the flange-headed post 16, a sensor or switch may send a "push" signal to the PCB. If the "push" signal is received while the PCB logic is in the unlocked state, a current will be sent through the SMA actuator 20 to cause the interference member to selectively unlock the slider 18'. This dual input may allow the push-push latch 10' to sit in a locked or unlocked state without drawing power to unlock the slider 18' until the release of the push-push latch 10' is demanded.

Figure 20:
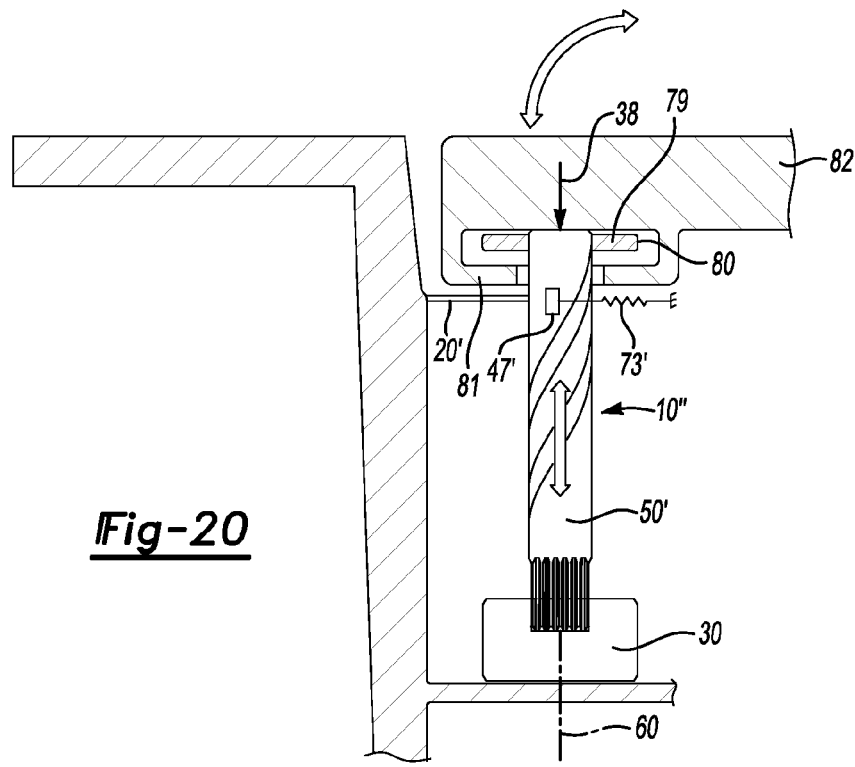
FIG. 20 is a semi-schematic bottom view of an example of a locking push-push latch with a rotary action according to the present disclosure.
Figure 21:
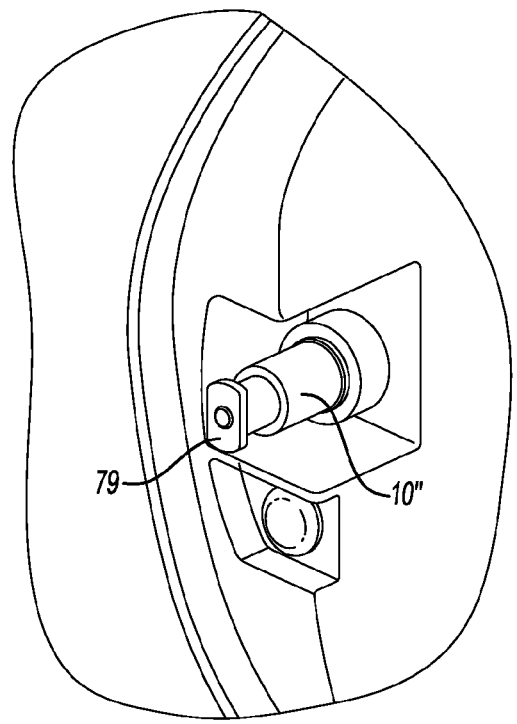
FIG. 21 is a right perspective view of an example of the locking push-push latch shown in FIG. 20, depicted in a fuel filler housing.
Figure 22:
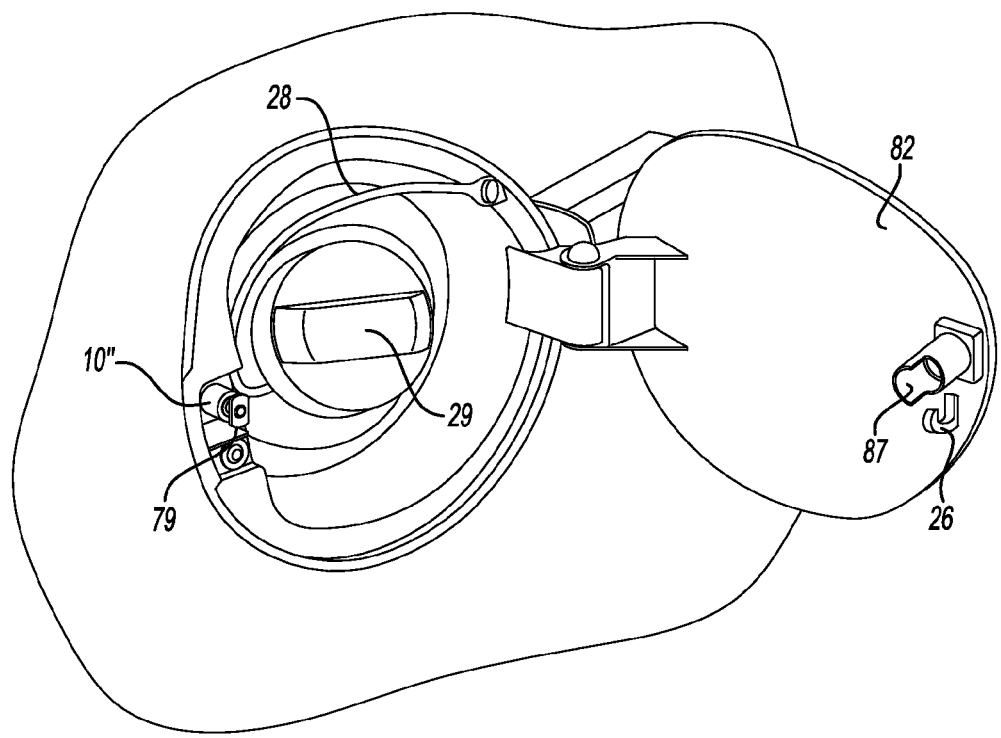
FIG. 22 is a perspective view of the example of the locking push-push latch shown in FIG. 21, depicted with the fuel filler door in a fully open state.

FIGS. 20-22 depict an example of a push-push latch 10" in which the push-push mechanism works with rotating cams. The push-push latch 10" includes a push-push mechanism 50' to alternate between a retracted state and an extended state in response to alternating application and removal of an actuating force 38 on the push-push mechanism 50' along an axis of rotation 60 of the push-push mechanism 50'. An actuator lever 47' is attached to the push-push mechanism 50' to cause the push-push mechanism 50' to rotate upon a selectable actuation of an SMA actuator 20' attached to the actuator lever 47'. A resilient element 30 is to urge the push-push mechanism 50' toward the extended state. A key flange 79 is disposed at a latch end 80 of the push-push mechanism 50'. The key flange 79 is complementary to an engagement hook 81 disposed on a closure panel 82 to have a locked rotational state and an unlocked rotational state. The selectable actuation of the SMA actuator 20' causes the push-push mechanism 50' to rotate to the unlocked rotational state. A locking spring 73' urges the push-push mechanism 50' to rotate to the locked rotational state and returns the SMA actuator 20' to an unactuated condition when the selectable actuation of the SMA actuator 20' is selectably terminated.

Figure 23:
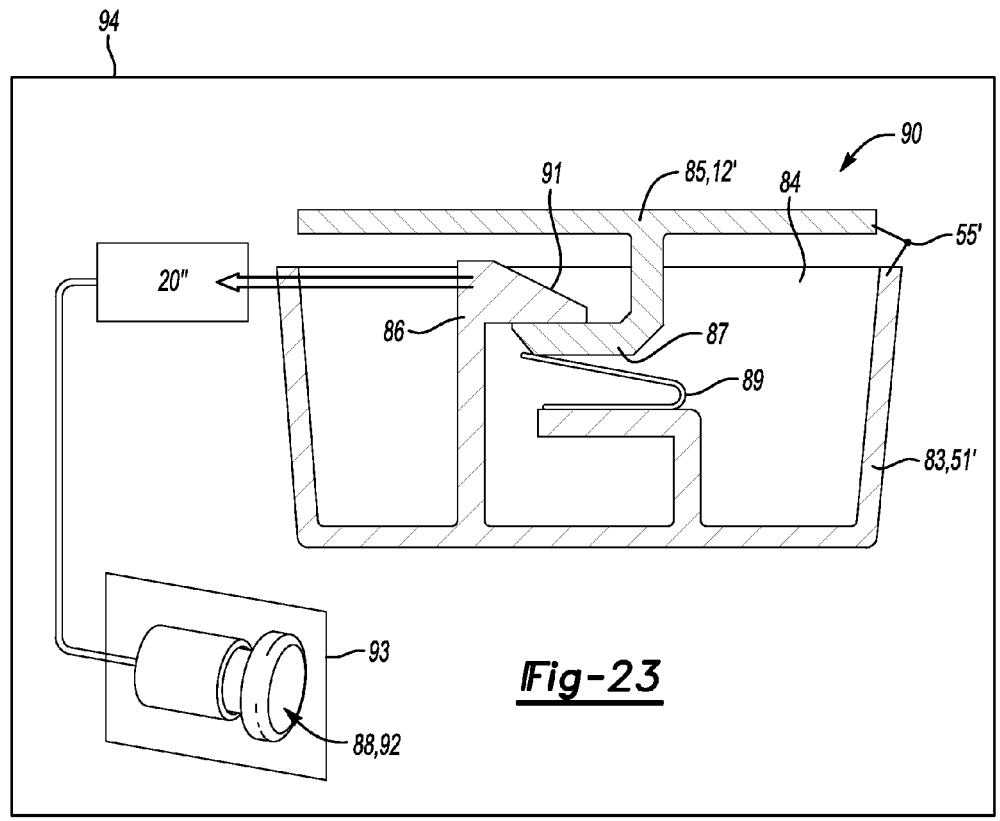
FIG. 23 is a perspective view of an example of a Shape Memory Alloy (SMA) actuated latch according to the present disclosure.

FIG. 23 is a perspective view of an example of an SMA actuated latch according to the present disclosure. A latching hinged closure system 90 is shown including a plastic body 83 defining an opening 84. A closure 85 is to selectably cover the opening 84. A hinge 55' is to pivotably retain the closure 85. A cantilever latch 86 is integrally molded with the plastic body 83. A catch 87 is attached to the closure 85 to engage the cantilever latch 86 and selectably retain the closure 85 in a closed state. An SMA actuator 20" is attached to the cantilever latch 86 to disengage the cantilever latch 86 from the catch 87 when the SMA actuator 20" is actuated. A user interface 88 is included in the system to selectively cause an electronic command signal to actuate the SMA actuator 20". An electrical power source (not shown) is to be electrically connected to the SMA actuator 20" to cause electric current to flow through the SMA actuator 20" and actuate the SMA actuator 20" in response to the electronic command signal to actuate the SMA actuator 20". A molded spring 89 is to urge the closure 85 to rotate about the hinge 55' away from the closed state toward an open state. A chamfer 91 on the cantilever latch 86 causes the cantilever latch 86 to bend to receive the catch 87 when the closure 85 is forced from the open state to the closed state. In an example of the latching hinged closure system 90 of the present disclosure, the closure 85 may be a fuel filler door 12', the plastic body 83 may be a fuel filler housing 51', and the user interface 88 may be an electrical fuel filler door release button 92 disposed in a passenger compartment 93 of a vehicle 94.

Figure 24A:
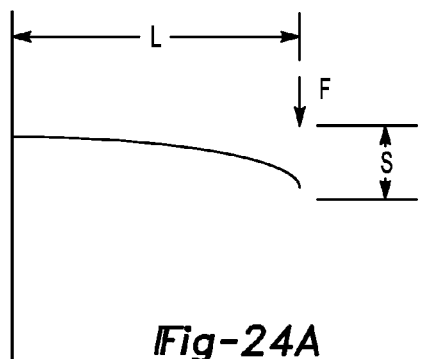
FIGS. 24A-24B are schematic views to define dimensions for spring calculations applied to the example of the SMA actuated latch depicted in FIG. 23.
Figure 24B:
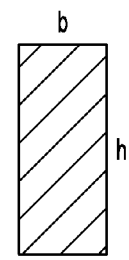

FIGS. 24A-24B are schematic views to define dimensions for spring calculations applied to the example of the SMA actuated latch depicted in FIG. 23.

$$S = (L^3/3) \times (F/(E \times I))$$    Eq. 1

Where:
S=Displacement at End=6 mm;
L=Length of Beam=40 mm;
E=Modulus of Elasticity=3236.73 Mpa;
I=Moment of Inertia=0.083 b×h$^3$; and
b=2 mm; h=5 mm.
Solving Eq. 1 for F yields: F=Force to bend the beam=19 N.

It is to be understood that the ranges provided herein include the stated range and any value or sub-range within the stated range. For example, a range from about 9V to about 16V should be interpreted to include not only the explicitly recited limits of about 9V to about 16V, but also to include individual values, such as 10V, 10.5V, 15V, etc., and sub-ranges, such as from about 10V to about 11V; from about 9.8V to about 15.2V, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

The invention claimed is:

1. A push-push latch, comprising:
   a frame;
   a slider slidably disposed on the frame;
   a resilient element to urge the slider toward an extended state;
   a cam-track defined by the slider or the frame;
   a pin member connected to the frame or the slider, the pin member to selectably engage a closed course in the cam-track to cause the slider to alternate between a retracted state and the extended state in response to alternating application and removal of an actuating force on the slider;
   an interference member disposed on the frame to selectively prevent the pin member from engaging a portion of the closed course thereby locking the slider in the retracted state;
   a pivotable catch rotatably disposed on the slider to open in the extended state and to close in the retracted state; and
   a shape memory alloy (SMA) actuator to selectively cause the interference member to selectively prevent the pin member from engaging the closed course.

2. The push-push latch as defined in claim 1, further comprising an electrical connector in electrical contact with the SMA actuator to connect the SMA actuator to an actuating source of electrical energy.

3. The push-push latch as defined in claim 2, further comprising:
   a sensor to detect movement of the slider in response to the actuating force wherein the SMA actuator is connected to the actuating source of electrical energy in response to a detection of the movement of the slider in response to the actuating force.

4. The push-push latch as defined in claim 2, further comprising:
   a sensing element to detect a completion of actuation of the SMA actuator, wherein an electrical power supplied to the SMA actuator is reduced in response to the sensing element detecting the completion of actuation of the SMA actuator.

5. The push-push latch as defined in claim 1 wherein the pivotable catch is rotatably disposed on the slider to open and close in response to relative movement of the slider with respect to the frame wherein the pivotable catch is to selectively capture a flange-headed post fixedly attached to an object.

6. The push-push latch as defined in claim 5 wherein the frame is attached to a fuel filler housing and the flange-headed post is attached to a fuel filler door.

7. A push-push latch comprising:
   a frame;
   a slider slidably disposed on the frame;
   a resilient element to urge the slider toward an extended state;
   a cam-track defined by the slider or the frame;
   a pin member connected to the frame or the slider, the pin member to selectably engage a closed course in the cam-track to cause the slider to alternate between a retracted state and the extended state in response to alternating application and removal of an actuating force on the slider;
   an interference member disposed on the frame to selectively prevent the pin member from engaging a portion of the closed course thereby locking the slider in the retracted state;
   a pivotable catch rotatably disposed on the slider to open in the extended state and to close in the retracted state;
   a shape memory alloy (SMA) actuator to selectively cause the interference member to selectively prevent the pin member from engaging the closed course;
   a cam spring having:
     a first leg on a cam follower end of the cam spring;
     an anchor end distal to the cam follower end;
     a second leg on the anchor end; and
     a resilient bridge connecting the first leg and the second leg wherein the first leg is the pin member and the second leg is attached to the frame;
   an index lever projecting from the resilient bridge;
   an actuator lever pivotably attached to the frame, the actuator lever in operable contact with the index lever wherein the actuator lever is the interference member; and
   an extension spring connected to the actuator lever and to the frame to urge the actuator lever antagonistically to the resilient bridge via the index lever to extract the pin member from the closed course in the cam-track thereby locking the slider in the retracted state;
   wherein the SMA actuator is connected to the actuator lever to contract in an actuated state to overcome the extension spring and allow the resilient bridge to cause the pin member to engage the closed course and wherein the extension spring is to cause the SMA actuator to stretch in an unactuated state.

8. The push-push latch as defined in claim 7, further comprising:
   an electrical connector in electrical contact with the SMA actuator to connect the SMA actuator to an actuating source of electrical energy;
   a first electrical switch to close an electrical circuit to connect the SMA actuator to the actuating source of electrical energy in response to a detection of a movement of the slider in response to the actuating force; and a second electrical switch to detect a completion of actuation of the SMA actuator wherein an electrical power supplied to the SMA actuator is reduced in response to the second electrical switch detecting the completion of actuation of the SMA actuator.

9. The push-push latch as defined in claim 7 wherein the pivotable catch is rotatably disposed on the slider to open and close in response to relative movement of the slider with respect to the frame wherein the pivotable catch is to selectively capture a flange-headed post fixedly attached to an object.

10. The push-push latch as defined in claim 9 wherein the frame is attached to a fuel filler housing, and the flange-headed post is attached to a fuel filler door.

11. A push-push latch comprising:
a frame;
a slider slidably disposed on the frame;
a resilient element to urge the slider toward an extended state;
a cam-track defined by the slider or the frame;
a pin member connected to the frame or the slider, the pin member to selectably engage a closed course in the cam-track to cause the slider to alternate between a retracted state and the extended state in response to alternating application and removal of an actuating force on the slider;
an interference member disposed on the frame to selectively prevent the pin member from engaging a portion of the closed course thereby locking the slider in the retracted state;
a pivotable catch rotatably disposed on the slider to open in the extended state and to close in the retracted state; and
a shape memory alloy (SMA) actuator to selectively cause the interference member to selectively prevent the pin member from engaging the closed course, wherein:
the slider is slidable along a longitudinal axis of the frame;
a shuttle slot is defined in the frame perpendicular to the longitudinal axis;
a shuttle is slidably disposed in the shuttle slot, the shuttle having the pin member extend from the shuttle into the cam-track;
a hinge knuckle is disposed on the frame at a hinge end of the frame;
a blocking pawl is pivotably disposed about a hinge pin;
the blocking pawl is the interference member;
the blocking pawl has a pawl end and a heel end on opposite sides of the hinge pin;
the hinge pin is disposed through the blocking pawl and the hinge knuckle;
a locking spring to urge the blocking pawl to a locked position in contact with the shuttle to selectively prevent the pin member from engaging the portion of the closed course thereby locking the slider in the retracted state;
an SMA wire is attached to the frame at a catch end distal to the hinge end;
the SMA wire is looped around the heel end of the blocking pawl;
the SMA wire is to produce a torque on the blocking pawl when the SMA wire is actuated;
the torque on the blocking pawl is antagonistic to the locking spring;
upon actuation of the SMA wire, the SMA wire is to overcome the locking spring and lift the pawl end to allow the shuttle to slide in the shuttle slot without interference from the blocking pawl and thereby to allow the pin member to engage the closed course in the cam-track to cause the slider to alternate between the retracted state and the extended state in response to alternating application and removal of the actuating force on the slider; and
upon termination of the actuation of the SMA wire, the SMA wire is to relax and stretch to cause the blocking pawl to return to the locked position.

12. The push-push latch as defined in claim 11, further comprising:
an electrical connector in electrical contact with the SMA wire to connect the SMA wire to an actuating source of electrical energy;
a first electrical switch to close an electrical circuit to connect the SMA wire to the actuating source of electrical energy in response to a detection of a movement of the slider in response to the actuating force; and
a second electrical switch to detect a completion of actuation of the SMA wire wherein an electrical power supplied to the SMA wire is reduced in response to the second electrical switch detecting the completion of actuation of the SMA wire.

13. The push-push latch as defined in claim 11, further comprising:
an elastic element disposed mechanically in series with the slider to absorb an overload force greater than the actuating force applied to the slider.

14. The push-push latch as defined in claim 11 wherein the pivotable catch is rotatably disposed on the slider to open and close in response to relative movement of the slider with respect to the frame wherein the pivotable catch is to selectively capture a flange-headed post fixedly attached to an object.

15. The push-push latch as defined in claim 14 wherein the frame is attached to a fuel filler housing and the flange-headed post is attached to a fuel filler door.

16. The push-push latch as defined in claim 11, further comprising an SMA force generator operatively attached to the slider to selectably cause the actuating force on the slider.

17. The push-push latch as defined in claim 1, further comprising:
an other SMA actuator to selectively cause the interference member to selectively allow the pin member to engage the closed course; and
an over-center spring operatively connected to the interference member wherein:
in response to the interference member entering a first position corresponding to preventing the pin member from engaging the closed course, the over-center spring is to hold the interference member, without power being applied to the SMA actuator, in the first position until the other SMA actuator causes the interference member to enter a second position corresponding to allowing the pin member to engage the closed course; and
in response to the interference member entering the second position corresponding to allowing the pin member to engage the closed course, the over-center spring is to hold the interference member, without power being applied to the other SMA actuator in the second position, until the SMA actuator causes the interference member to enter the first position corresponding to preventing the pin member from engaging the closed course.

* * * * *